US011684087B2

(12) United States Patent
Bless et al.

(10) Patent No.: US 11,684,087 B2
(45) Date of Patent: *Jun. 27, 2023

(54) SMOKING ARTICLE FOR IDENTIFYING AN ATTRIBUTE OF AN AEROSOL-GENERATING ELEMENT FOR ADAPTIVE POWER OUTPUT AND AN ASSOCIATED METHOD

(71) Applicant: RAI Strategic Holdings, Inc., Winston-Salem, NC (US)

(72) Inventors: Alfred Charles Bless, Asheboro, NC (US); Rajesh Sur, Winston-Salem, NC (US); Stephen Benson Sears, Siler City, NC (US); Tim Williams, Walnut Cove, NC (US)

(73) Assignee: RAI Strategic Holdings, Inc., Winston-Salem, NC (US)

( * ) Notice: Subject to any disclaimer, the term of this patent is extended or adjusted under 35 U.S.C. 154(b) by 430 days.

This patent is subject to a terminal disclaimer.

(21) Appl. No.: 17/068,366

(22) Filed: Oct. 12, 2020

(65) Prior Publication Data

US 2021/0022402 A1 Jan. 28, 2021

Related U.S. Application Data

(63) Continuation of application No. 16/786,309, filed on Feb. 10, 2020, now Pat. No. 10,834,973, which is a (Continued)

(51) Int. Cl.
*A24F 40/50* (2020.01)
*H05B 1/02* (2006.01)
(Continued)

(52) U.S. Cl.
CPC .............. *A24F 40/50* (2020.01); *A24F 40/46* (2020.01); *A24F 40/53* (2020.01); (Continued)

(58) Field of Classification Search
None
See application file for complete search history.

(56) References Cited

U.S. PATENT DOCUMENTS 3,419,015 A 12/1968 Wochnowski
4,054,145 A 10/1977 Berndt et al.
(Continued)

FOREIGN PATENT DOCUMENTS

CN 102264251 A 11/2011
CN 103889258 A 6/2014
(Continued)

OTHER PUBLICATIONS

Chemical and Biological Studies on New Cigarette Prototypes that Heat Instead of Bum Tobacco, RJRTC Monograph, 1988.
(Continued)

*Primary Examiner* — James Harvey
(74) *Attorney, Agent, or Firm* — Womble Bond Dickinson (US) LLP; Chris Humphrey; John V. Forcier

(57) ABSTRACT

A smoking article and a method for making a smoking article are provided. The smoking article includes an aerosol-generating element configured to produce an aerosol in response to heat, a housing defining a cavity configured to receive the aerosol-generating element therein, a heating element engaged with the housing and configured to provide heat to the aerosol-generating element, a power source in electrical communication with the heating element and configured to provide electrical energy thereto, the heating element producing heat in response to the electrical energy, an aerosol-generating element identification device configured to identify an attribute of the aerosol-generating element, and a control device in communication with the aerosol-generating element identification device and configured to modulate the electrical energy provided to the heating element by the power source to direct the heating
(Continued)

element to heat the aerosol-generating element to an aerosolization temperature associated with the identified attribute of the aerosol-generating element.

19 Claims, 8 Drawing Sheets

Related U.S. Application Data continuation of application No. 15/639,634, filed on Jun. 30, 2017, now Pat. No. 10,575,562.

(51) Int. Cl.
*A24F 40/46* (2020.01)
*A24F 40/53* (2020.01)
*G06K 7/10* (2006.01)
*G06K 7/14* (2006.01)
*A24D 1/20* (2020.01)
*A24F 40/10* (2020.01)
*A24F 40/20* (2020.01)

(52) U.S. Cl.
CPC ....... *G06K 7/10366* (2013.01); *G06K 7/1413* (2013.01); *G06K 7/1417* (2013.01); *H05B 1/02* (2013.01); *H05B 1/0227* (2013.01); *H05B 1/0252* (2013.01); *A24D 1/20* (2020.01); *A24F 40/10* (2020.01); *A24F 40/20* (2020.01)

(56) References Cited

U.S. PATENT DOCUMENTS 4,449,541 A 5/1984 Mays et al.
4,735,217 A 4/1988 Gerth et al.
4,793,365 A 12/1988 Sensabaugh, Jr. et al.
4,807,809 A 2/1989 Pryor et al.
4,830,028 A 5/1989 Lawson et al.
4,836,224 A 6/1989 Lawson et al.
4,887,619 A 12/1989 Burcham, Jr. et al.
4,889,143 A 12/1989 Pryor et al.
4,922,901 A 5/1990 Brooks et al.
4,924,887 A 5/1990 Raker et al.
4,924,888 A 5/1990 Perfetti et al.
4,947,874 A 8/1990 Brooks et al.
4,947,875 A 8/1990 Brooks et al.
5,022,416 A 6/1991 Watson
5,025,814 A 6/1991 Raker
5,056,537 A 10/1991 Brown et al.
5,060,671 A 10/1991 Counts et al.
5,060,676 A 10/1991 Hearn et al.
5,093,894 A 3/1992 Deevi et al.
5,101,839 A 4/1992 Jakob et al.
5,103,842 A 4/1992 Strang et al.
5,105,831 A 4/1992 Banerjee et al.
5,159,942 A 11/1992 Brinkley et al.
5,220,930 A 6/1993 Gentry
5,224,498 A 7/1993 Deevi et al.
5,228,460 A 7/1993 Sprinkel et al.
5,249,586 A 10/1993 Morgan et al.
5,261,424 A 11/1993 Sprinkel, Jr.
5,322,075 A 7/1994 Deevi et al.
5,353,813 A 10/1994 Deevi et al.
5,360,023 A 11/1994 Blakley et al.
5,372,148 A 12/1994 McCafferty et al.
5,468,936 A 11/1995 Deevi et al.
5,498,850 A 3/1996 Das
5,498,855 A 3/1996 Deevi et al.
5,530,225 A 6/1996 Hajaligol
5,573,692 A 11/1996 Das et al.
5,591,368 A 1/1997 Fleischhauer et al.
5,659,656 A 8/1997 Das
5,665,262 A 9/1997 Hajaligol et al.
5,666,977 A 9/1997 Higgins et al.
5,711,320 A 1/1998 Martin
5,934,289 A 8/1999 Watkins et al.
5,954,979 A 9/1999 Counts et al.
5,967,148 A 10/1999 Harris et al.
6,040,560 A 3/2000 Fleischhauer et al.
6,053,176 A 4/2000 Adams et al.
6,164,287 A 12/2000 White
6,196,218 B1 3/2001 Voges
6,701,936 B2 3/2004 Shafer et al.
6,730,832 B1 5/2004 Dominguez et al.
6,772,756 B2 8/2004 Shayan
6,803,545 B2 10/2004 Blake et al.
6,810,883 B2 11/2004 Feller et al.
6,854,461 B2 2/2005 Nichols et al.
7,011,096 B2 3/2006 Li et al.
7,017,585 B2 3/2006 Li et al.
7,025,066 B2 4/2006 Lawson et al.
7,040,314 B2 5/2006 Nguyen et al.
7,290,549 B2 11/2007 Banerjee et al.
7,293,565 B2 11/2007 Griffin et al.
7,513,253 B2 4/2009 Kobayashi et al.
7,647,932 B2 1/2010 Cantrell et al.
7,726,320 B2 6/2010 Robinson et al.
7,832,410 B2 11/2010 Hon
7,896,006 B2 3/2011 Hamano et al.
8,079,371 B2 12/2011 Robinson et al.
8,156,944 B2 4/2012 Han
8,186,360 B2 5/2012 Marshall et al.
8,375,957 B2 2/2013 Hon
8,402,976 B2 3/2013 Fernando et al.
8,794,231 B2 8/2014 Thorens et al.
8,851,083 B2 10/2014 Oglesby et al.
8,910,639 B2 12/2014 Chang et al.
8,915,254 B2 12/2014 Monsees et al.
8,925,555 B2 1/2015 Monsees et al.
2004/0255965 A1 12/2004 Perfetti et al.
2006/0196518 A1 9/2006 Hon
2007/0215167 A1 9/2007 Llewellyn Crooks et al.
2009/0188490 A1 7/2009 Han
2009/0320863 A1 12/2009 Fernando et al.
2010/0024834 A1 2/2010 Oglesby et al.
2010/0028766 A1 2/2010 Peckerar et al.
2010/0163063 A1 7/2010 Fernando et al.
2010/0307518 A1 12/2010 Wang
2012/0042885 A1 2/2012 Stone
2012/0152265 A1 6/2012 Dube et al.
2012/0192880 A1 8/2012 Dube et al.
2013/0008457 A1 1/2013 Zheng et al.
2013/0104916 A1 5/2013 Bellinger et al.
2013/0255702 A1 10/2013 Griffith, Jr. et al.
2013/0319435 A1* 12/2013 Flick .................... A61M 11/041 219/490
2014/0096781 A1 4/2014 Sears et al.
2014/0246020 A1 9/2014 Minskoff et al.
2014/0270729 A1* 9/2014 DePiano ................. A24F 40/46 392/397
2015/0122274 A1 5/2015 Cohen et al.
2015/0157052 A1 6/2015 Ademe et al.
2015/0216232 A1 8/2015 Bless et al.
2015/0245659 A1 9/2015 DePiano et al.
2015/0335070 A1 11/2015 Sears et al.
2015/0344456 A1 12/2015 Dull et al.
2016/0302488 A1 10/2016 Fernando et al.
2016/0345627 A1* 12/2016 Liu ......................... A24F 40/95
2016/0360785 A1 12/2016 Bless et al.
2017/0273358 A1 9/2017 Batista et al.
2017/0318861 A1 11/2017 Thorens
2018/0084831 A1 3/2018 Mironov
2019/0000144 A1 1/2019 Bless et al.
2019/0099561 A1 4/2019 Nettenstrom
2020/0170304 A1 6/2020 Bless et al.
2020/0323275 A1* 10/2020 Baker ...................... H04W 4/80
2021/0022402 A1* 1/2021 Bless ...................... A24F 40/46

FOREIGN PATENT DOCUMENTS

CN 105163610 A 12/2015
CN 106455716 A 2/2017

(56) References Cited

FOREIGN PATENT DOCUMENTS

| | | | |
|---|---|---|---|
| CN | 106455722 | A | 2/2017 |
| CN | 106820265 | A | 6/2017 |
| EP | 2 201 850 | A1 | 6/2010 |
| JP | 2017506070 | A | 3/2017 |
| RU | 2 618 436 | C2 | 5/2017 |
| WO | WO 98/57556 | | 12/1998 |
| WO | WO 02/37990 | | 5/2002 |
| WO | WO 2010/091593 | | 8/2010 |
| WO | WO 2011/160788 | | 12/2011 |
| WO | WO 2015/192084 | | 12/2015 |
| WO | 2016/200815 | A2 | 12/2016 |

OTHER PUBLICATIONS

Bombick et al., "Evaluation of the Genotoxic and Cytotoxic Potential of Mainstream Whole Smoke and Smoke Condensate from a Cigarette Containing a Novel Carbon Filter," Fundamental and Applied Toxicology, 1997, vol. 39, pp. 11-17.

Gutcho, "Tobacco Flavoring Substances and Methods," Noyes Data Corp, 1972.

Leffingwell, et al., Tobacco Flavoring for Smoking Products, R.J. Reynolds Tobacco Company, 1972.

* cited by examiner

600 ─┐

602 — OPERABLY ENGAGING A HEATING ELEMENT WITH A HOUSING DEFINING A CAVITY CONFIGURED TO RECEIVE AN AEROSOL-GENERATING ELEMENT THEREIN, THE HEATING ELEMENT BEING CONFIGURED TO PROVIDE HEAT TO THE AEROSOL-GENERATING ELEMENT FOR THE AEROSOL-GENERATING ELEMENT TO PRODUCE AN AEROSOL IN RESPONSE THERETO

604 — ENGAGING A POWER SOURCE IN ELECTRICAL COMMUNICATION WITH THE HEATING ELEMENT, THE POWER SOURCE BEING CONFIGURED TO PROVIDE ELECTRICAL ENERGY TO THE HEATING ELEMENT, AND THE HEATING ELEMENT PRODUCING HEAT IN RESPONSE TO THE ELECTRICAL ENERGY;

606 — ENGAGING AN AEROSOL-GENERATING ELEMENT IDENTIFICATION DEVICE WITH THE HOUSING, THE AEROSOL-GENERATING ELEMENT IDENTIFICATION DEVICE BEING CONFIGURED TO IDENTIFY, UPON ACTUATION THEREOF, AN ATTRIBUTE OF THE AEROSOL-GENERATING ELEMENT

608 — ENGAGING A CONTROL DEVICE WITH THE AEROSOL-GENERATING ELEMENT IDENTIFICATION DEVICE, THE CONTROL DEVICE BEING CONFIGURED TO MODULATE THE ELECTRICAL ENERGY PROVIDED TO THE HEATING ELEMENT BY THE POWER SOURCE SO AS TO DIRECT THE HEATING ELEMENT TO HEAT THE AEROSOL-GENERATING ELEMENT TO AN AEROSOLIZATION TEMPERATURE ASSOCIATED WITH THE IDENTIFIED ATTRIBUTE OF THE AEROSOL-GENERATING ELEMENT

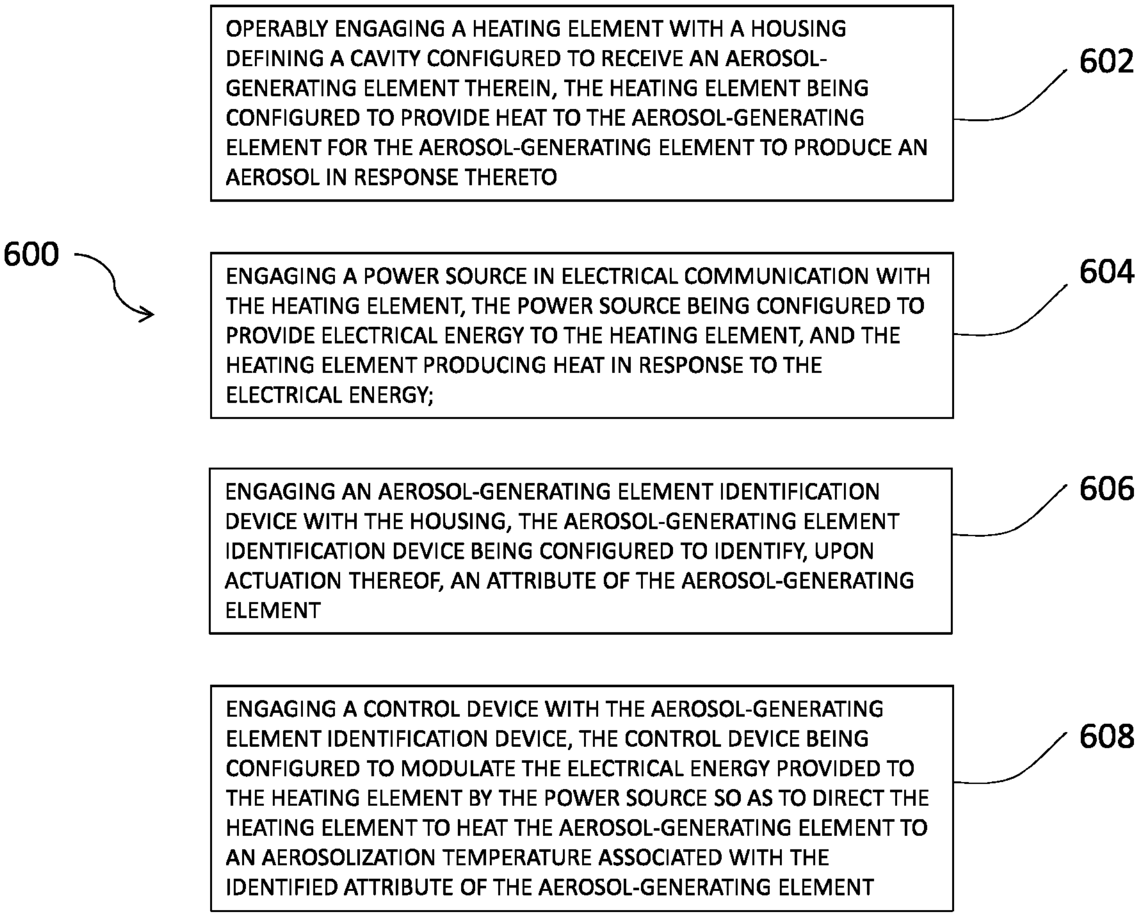

FIG. 6

SMOKING ARTICLE FOR IDENTIFYING AN ATTRIBUTE OF AN AEROSOL-GENERATING ELEMENT FOR ADAPTIVE POWER OUTPUT AND AN ASSOCIATED METHOD

CROSS-REFERENCE TO RELATED APPLICATIONS

This application is a continuation of U.S. application Ser. No. 16/786,309, filed Feb. 10, 2020, which is a continuation of U.S. application Ser. No. 15/639,634, filed Jun. 30, 2017 and which issued as U.S. Pat. No. 10,575,562 on Mar. 3, 2020, which applications are hereby incorporated by reference in their entirety in this application.

BACKGROUND

Field of the Disclosure

The present disclosure relates to aerosol delivery devices and systems, such as smoking articles; and more particularly, to aerosol delivery devices and systems that utilize electrically-generated heat for the production of aerosol (e.g., smoking articles for purposes of yielding components of tobacco and other materials in an inhalable form, commonly referred to as electronic cigarettes). Highly preferred components of such articles are made or derived from tobacco, or those articles can be characterized as otherwise incorporating tobacco for human consumption, and which are capable of vaporizing components of tobacco and/or other tobacco related materials to form an inhalable aerosol for human consumption.

Description of Related Art

Many smoking devices have been proposed through the years as improvements upon, or alternatives to, smoking products that require combusting tobacco for use. Many of those devices purportedly have been designed to provide the sensations associated with cigarette, cigar, or pipe smoking, but without delivering considerable quantities of incomplete combustion and pyrolysis products that result from the burning of tobacco. To this end, there have been proposed numerous smoking products, flavor generators, and medicinal inhalers that utilize electrical energy to vaporize or heat a volatile material, or attempt to provide the sensations of cigarette, cigar, or pipe smoking without burning tobacco to a significant degree. See, for example, the various alternative smoking articles, aerosol delivery devices and heat generating sources set forth in the background art described in U.S. Pat. No. 7,726,320 to Robinson et al.; and U.S. Pat. App. Pub. Nos. 2013/0255702 to Griffith, Jr. et al.; and 2014/0096781 to Sears et al., which are incorporated herein by reference. See also, for example, the various types of smoking articles, aerosol delivery devices and electrically powered heat generating sources referenced by brand name and commercial source in U.S. Pat. App. Pub. No. 2015/0220232 to Bless et al., which is incorporated herein by reference. Additional types of smoking articles, aerosol delivery devices and electrically powered heat generating sources referenced by brand name and commercial source are listed in U.S. Pat. App. Pub. No. 2015/0245659 to DePiano et al., which is also incorporated herein by reference in its entirety.

Certain tobacco products that have employed electrical energy to produce heat for aerosol formation, and in particular, certain products that have been referred to as electronic cigarette products, have been commercially available throughout the world. Representative products that resemble many of the attributes of traditional types of cigarettes, cigars or pipes have been marketed as ACCORD® by Philip Morris Incorporated; ALPHA™, JOYE 510™ and M4™ by InnoVapor LLC; CIRRUS™ and FLING™ by White Cloud Cigarettes; BLU™ by Lorillard Technologies, Inc.; COHITA™, COLIBRI™, ELITE CLASSIC™, MAGNUM™, PHANTOM™ and SENSE™ by EPUFFER® International Inc.; DUOPRO™, STORM™ and VAPORKING® by Electronic Cigarettes, Inc.; EGAR™ by Egar Australia; eGo-C™ and eGo-T™ by Joyetech; ELUSION™ by Elusion UK Ltd; EONSMOKE® by Eonsmoke LLC; FIN™ by FIN Branding Group, LLC; SMOKE® by Green Smoke Inc. USA; GREENARETTE™ by Greenarette LLC; HALLIGAN™, HENDU™, JET™, MAXXQ™, PINK™ and PITBULL™ by SMOKE STIK®; HEATBAR™ by Philip Morris International, Inc.; HYDRO IMPERIAL™ and LXE™ from Crown7; LOGIC™ and THE CUBAN™ by LOGIC Technology; LUCI® by Luciano Smokes Inc.; METRO® by Nicotek, LLC; NJOY® and ONEJOY™ by Sottera, Inc.; NO. 7™ by SS Choice LLC; PREMIUM ELECTRONIC CIGARETTE™ by PremiumEstore LLC; RAPP E-MYSTICK™ by Ruyan America, Inc.; RED DRAGON™ by Red Dragon Products, LLC; RUYAN® by Ruyan Group (Holdings) Ltd.; SF® by Smoker Friendly International, LLC; GREEN SMART SMOKER® by The Smart Smoking Electronic Cigarette Company Ltd.; SMOKE ASSIST® by Coastline Products LLC; SMOKING EVERYWHERE® by Smoking Everywhere, Inc.; V2CIGS™ by VMR Products LLC; VAPOR NINE™ by VaporNine LLC; VAPOR4LIFE® by Vapor 4 Life, Inc.; VEPPO™ by E-CigaretteDirect, LLC; VUSE® by R. J. Reynolds Vapor Company; Mistic Menthol product by Mistic Ecigs; and the Vype product by CN Creative Ltd. Yet other electrically powered aerosol delivery devices, and in particular those devices that have been characterized as so-called electronic cigarettes, have been marketed under the tradenames COOLER VISIONS™; DIRECT E-CIG™; DRAGONFLY™; EMIST™; EVERSMOKE™; GAMUCCI®; HYBRID FLAME™; KNIGHT STICKS™; ROYAL BLUES™; SMOKETIP®; SOUTH BEACH SMOKE™.

In some instances, the heat or heating profile, produced by the electrical energy for heating the aerosol-generating element to form an aerosol, is essentially the same regardless of the nature of the aerosol-generating element. Accordingly, there may be some limitations of such an arrangement, including, for example, decreased battery life, heat-related damage of the aerosol-generating element (i.e., scorching), and/or shortened service life of the aerosol-generating element (i.e., excess aerosol production per use).

As such, it would be desirable to provide a smoking article with an arrangement for modulating the heat provided to an aerosol-generating element of an electrically-powered smoking article in relation to an identified attribute of the aerosol-generating element. It would also be desirable that the smoking article comprise an arrangement for identifying the attribute of the aerosol-generating element and controlling the heat output accordingly.

BRIEF SUMMARY OF THE DISCLOSURE

A smoking article for identifying an attribute of an aerosol-generating element for adaptive power output and an associated method are disclosed.

In some aspects, a smoking article comprises an aerosol-generating element configured to produce an aerosol in response to heat; a housing defining a cavity configured to receive the aerosol-generating element therein; a heating element operably engaged with the housing and configured to provide heat to the aerosol-generating element; a power source in electrical communication with the heating element and configured to provide electrical energy thereto, the heating element producing heat in response to the electrical energy; an aerosol-generating element identification device engaged with the housing and configured to identify, upon actuation thereof, an attribute of the aerosol-generating element; and a control device in communication with the aerosol-generating element identification device and configured to modulate the electrical energy provided to the heating element by the power source so as to direct the heating element to heat the aerosol-generating element to an aerosolization temperature associated with the identified attribute of the aerosol-generating element.

In some other aspects, a method for making a smoking article comprises operably engaging a heating element with a housing defining a cavity configured to receive an aerosol-generating element therein, the heating element being configured to provide heat to the aerosol-generating element for the aerosol-generating element to produce an aerosol in response thereto; engaging a power source in electrical communication with the heating element, the power source being configured to provide electrical energy to the heating element, and the heating element producing heat in response to the electrical energy; engaging an aerosol-generating element identification device with the housing, the aerosol-generating element identification device being configured to identify, upon actuation thereof, an attribute of the aerosol-generating element; and engaging a control device with the aerosol-generating element identification device, the control device being configured to modulate the electrical energy provided to the heating element by the power source so as to direct the heating element to heat the aerosol-generating element to an aerosolization temperature associated with the identified attribute of the aerosol-generating element.

In further aspects, a smoking article comprises a solid aerosol-generating material configured to produce an aerosol in response to heat; a tubular housing defining a cavity configured to receive the solid aerosol-generating material therein; a heating element operably engaged with the tubular housing and configured to provide heat to the solid aerosol-generating material; a power source in electrical communication with the heating element and configured to provide electrical energy thereto, the heating element producing heat in response to the electrical energy; an aerosol-generating element identification device engaged with the housing and configured to identify, upon actuation thereof, an attribute of the solid aerosol-generating material; and a control device in communication with the aerosol-generating element identification device and configured to modulate the electrical energy provided to the heating element by the power source so as to direct the heating element to heat the solid aerosol-generating material to an aerosolization temperature associated with the identified attribute of the solid aerosol-generating material.

In still further aspects, a smoking article comprises an aerosol-generating liquid configured to produce an aerosol in response to heat; a tubular housing having a first end and a longitudinally-opposed second end, the tubular housing including an outer wall defining a cavity configured to receive the aerosol-generating liquid therein; a heating element configured to provide heat to the aerosol-generating liquid; and a component housing having a longitudinal end operably engaged with one of the first and second ends of the tubular housing and including: a power source in electrical communication with the heating element and configured to provide electrical energy thereto, the heating element producing heat in response to the electrical energy; an aerosol-generating element identification device engaged with the power source and configured to identify, upon actuation thereof, an attribute of the aerosol-generating liquid; and a control device configured to modulate the electrical energy provided to the heating element so as to direct the heating element to heat the aerosol-generating liquid to an aerosolization temperature associated with the identified attribute of the aerosol-generating liquid.

These and other features, aspects, and advantages of the disclosure will be apparent from a reading of the following detailed description together with the accompanying drawings, which are briefly described below.

BRIEF DESCRIPTION OF THE DRAWINGS

Figure 1A:
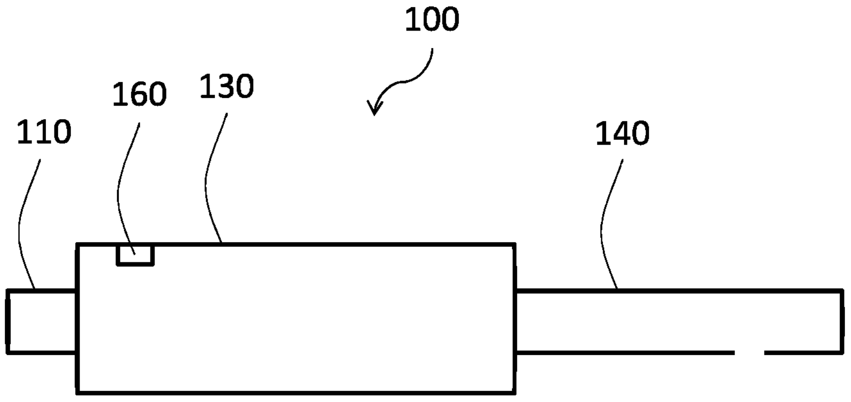
Figure 1B:
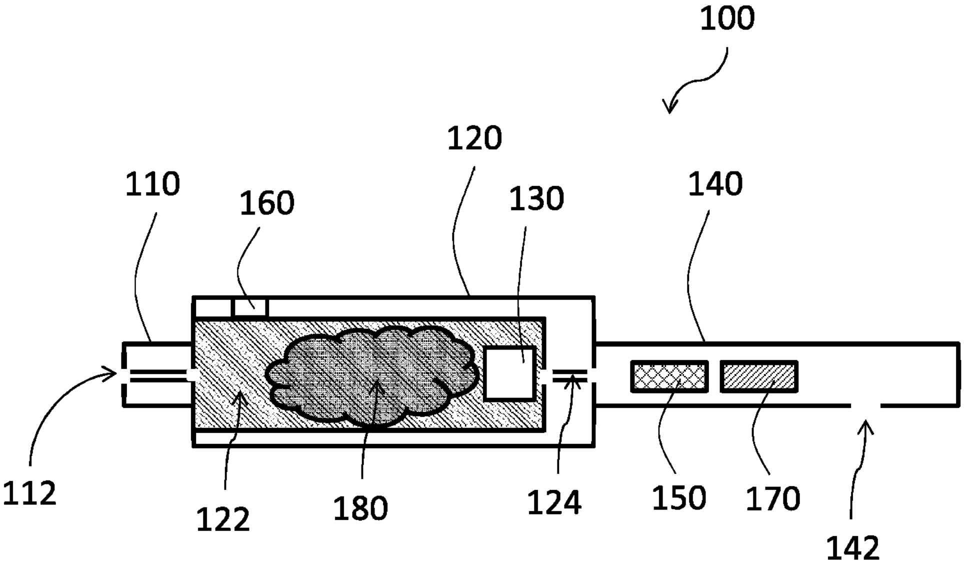
Figure 2:
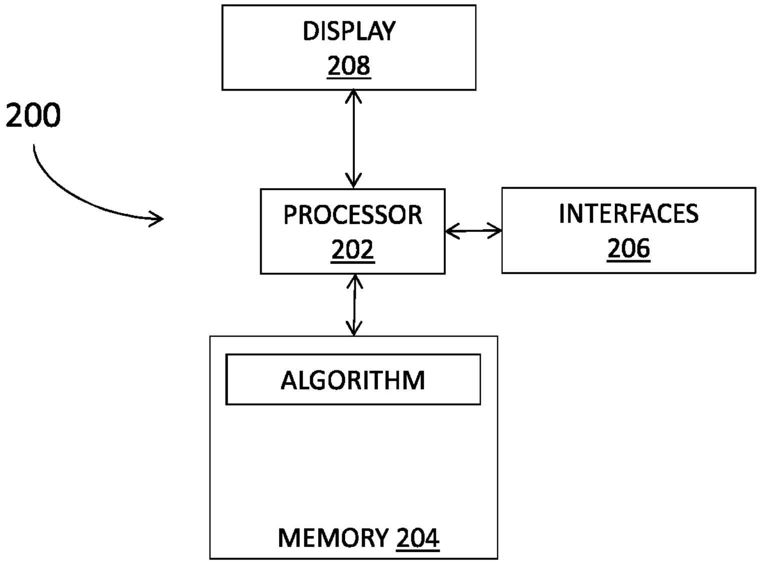
Figure 3A:
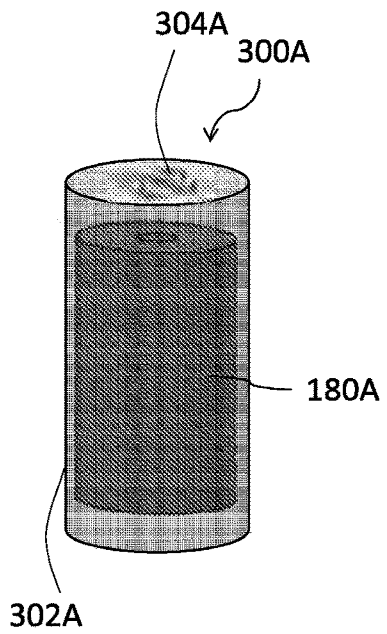
Figure 3B:
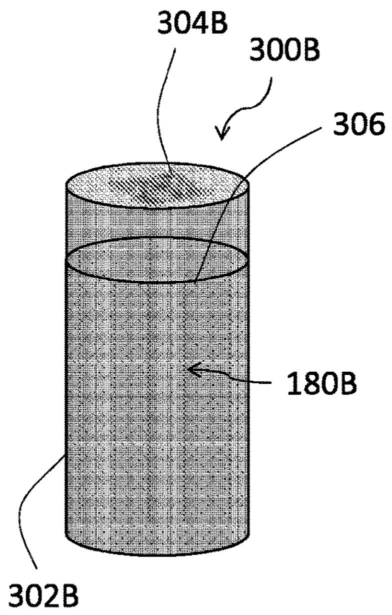
Figure 3C:
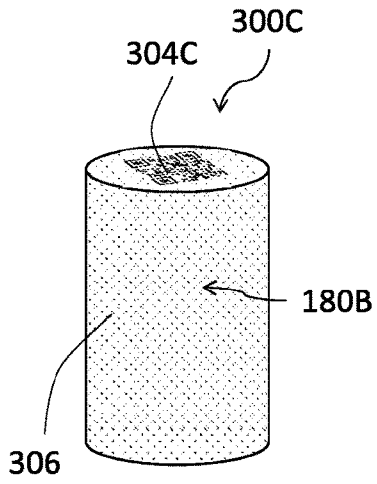
Figure 4A:
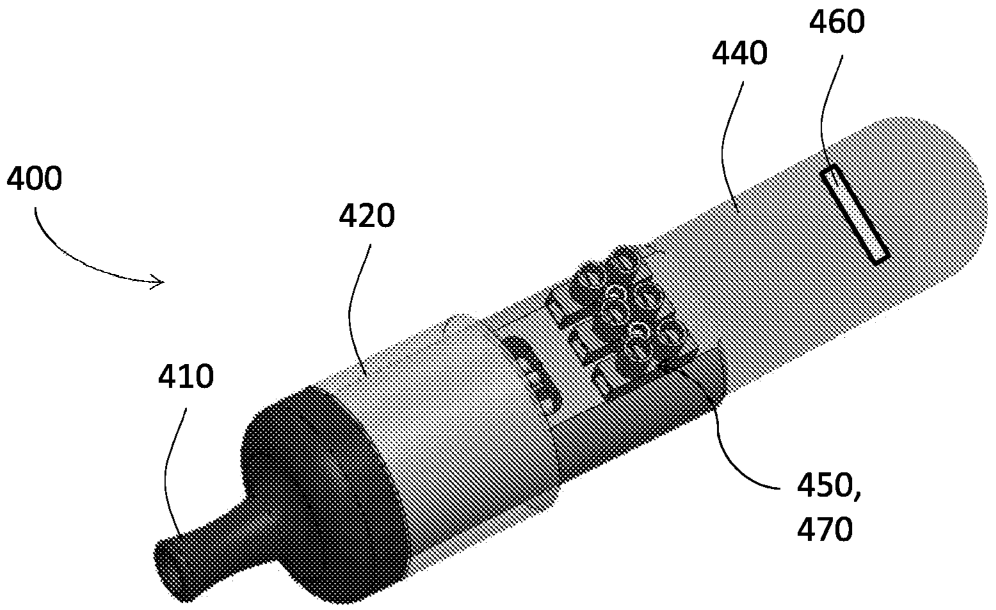
Figure 4B:
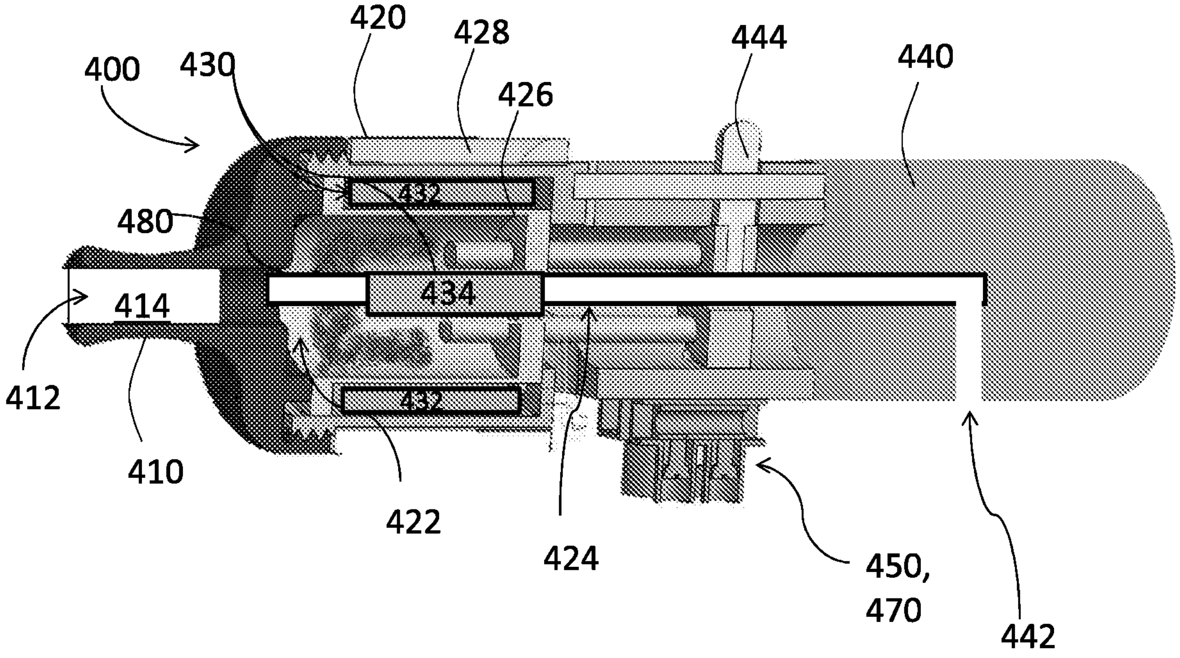
Figure 5:
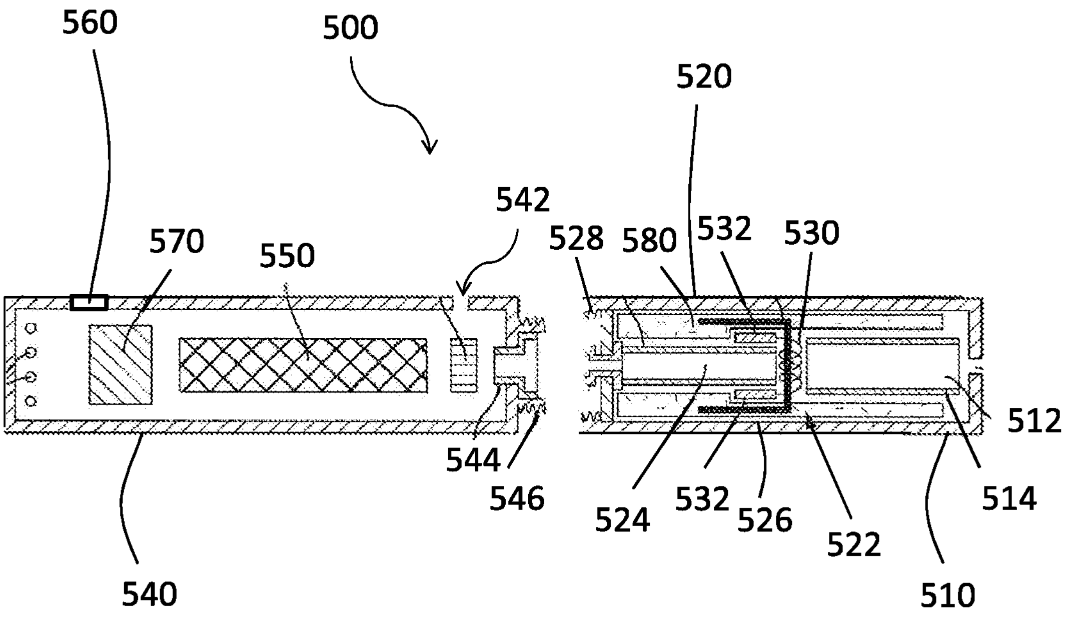

Having thus described the disclosure in the foregoing general terms, reference will now be made to the accompanying drawings, which are not necessarily drawn to scale, and wherein:

FIG. 1A illustrates a schematic of an exemplary smoking article in an assembled configuration and including an aerosol-generating element identification device according to an aspect of the present disclosure;

FIG. 1B illustrates a cross-sectional view of the smoking article of FIG. 1A;

FIG. 2 illustrates a schematic of an exemplary aerosol-generating element identification device according to an aspect of the present disclosure;

FIG. 3A illustrates a schematic of a packaging containing a solid aerosol-generating material, the packaging including an attribute identifier according to an aspect of the present disclosure;

FIG. 3B illustrates a schematic of a packaging of a cartridge containing an aerosol-generating liquid, the packaging including an attribute identifier according to an aspect of the present disclosure;

FIG. 3C illustrates a schematic of the cartridge of FIG. 3B without any of the aerosol-generating liquid contained therein, the cartridge including an attribute identifier according to an aspect of the present disclosure;

FIG. 4A illustrates a perspective view of an exemplary smoking article in an assembled configuration and including an aerosol-generating element identification device according to another aspect of the present disclosure;

FIG. 4B illustrates the cross-sectional view of the smoking article of FIG. 4A;

FIG. 5 illustrates a schematic of an exemplary smoking article in a disassembled configuration and including an aerosol-generating element identification device according to a still further aspect of the present disclosure; and FIG. 6 illustrates a method flow diagram for a method for making a smoking article according to an aspect of the present disclosure.

DETAILED DESCRIPTION OF THE DISCLOSURE

The present disclosure will now be described more fully hereinafter with reference to exemplary embodiments thereof. These exemplary embodiments are described so that this disclosure will be thorough and complete, and will fully convey the scope of the disclosure to those skilled in the art. Indeed, the disclosure may be embodied in many different forms and should not be construed as limited to the embodiments set forth herein; rather, these embodiments are provided so that this disclosure will satisfy applicable legal requirements. As used in the specification, and in the appended claims, the singular forms “a”, “an”, “the”, include plural referents unless the context clearly dictates otherwise.

The present disclosure provides descriptions of articles (and the manufacture thereof) that use electrical energy to heat a material (preferably without combusting the material to any significant degree) to form an aerosol and/or an inhalable substance; such articles most preferably being sufficiently compact to be considered “hand-held” devices. In certain highly preferred aspects, the articles are characterized as smoking articles. As used herein, the term “smoking article” is intended to mean an article and/or device that provides many of the sensations (e.g., inhalation and exhalation rituals, types of tastes or flavors, organoleptic effects, physical feel, use rituals, visual cues such as those provided by visible aerosol, and the like) of smoking a cigarette, cigar, or pipe, without any substantial degree of combustion of any component of that article and/or device. As used herein, the term “smoking article” does not necessarily mean that, in operation, the article or device produces smoke in the sense of an aerosol resulting from by-products of combustion or pyrolysis of tobacco, but rather, that the article or device yields vapors (including vapors within aerosols that can be considered to be visible aerosols that might be considered to be described as smoke-like) resulting from volatilization or vaporization of certain components, elements, and/or the like of the article and/or device. In highly preferred aspects, articles or devices characterized as smoking articles incorporate tobacco and/or components derived from tobacco.

Articles or devices of the present disclosure can also be characterized as being vapor-producing articles, aerosol delivery articles or medicament delivery articles. Thus, such articles or devices are adaptable so as to provide one or more substances in an inhalable form or state. For example, inhalable substances can be substantially in the form of a vapor (i.e., a substance that is in the gas phase at a temperature lower than its critical point). Alternatively, inhalable substances can be in the form of an aerosol (i.e., a suspension of fine solid particles or liquid droplets in a gas). For purposes of simplicity, the term “aerosol” as used herein is meant to include vapors, gases and aerosols of a form or type suitable for human inhalation, whether or not visible, and whether or not of a form that might be considered to be smoke-like.

In use, smoking articles of the present disclosure are subjected to many of the physical actions of an individual in using a traditional type of smoking article (e.g., a cigarette, cigar or pipe that is employed by lighting with a flame and used by inhaling tobacco that is subsequently burned and/or combusted). For example, the user of a smoking article of the present disclosure can hold that article much like a traditional type of smoking article, draw on one end of that article for inhalation of an aerosol produced by that article, and take puffs at selected intervals of time.

Smoking articles of the present disclosure generally include a number of components provided within a housing. The overall design of the housing is variable, and the format or configuration of the housing that defines the overall size and shape of the smoking article is also variable. Typically, a housing resembling the shape of a cigarette or cigar can be a formed from a single, unitary shell; or the housing can be formed of two or more separable pieces. For example, a smoking article can comprise a housing that can be substantially tubular in shape, and as such, resemble the shape of a conventional cigarette or cigar. In one aspect, a smoking article can comprise three outer housing components, bodies, or portions that are joined and are separable. For example, a smoking article can include, at one end, a power source portion comprising a component housing or shell containing one or more components (e.g., a rechargeable battery and/or various electronics, such as a controller, for controlling the operation of the smoking article), a mouthpiece portion, and a heat/aerosol-generating portion therebetween comprising a housing defining a cavity containing one or more components (e.g., a heating element and a solid tobacco and/or tobacco-related material for producing an aerosol).

In another aspect, a smoking article can comprise three housing components, bodies, or portions that are joined and are separable. Additionally or alternatively, the smoking article may include an additional housing component configured to be received within one or more of the three housing components. For example, the smoking article may include, at one end, an end cap portion, a mouthpiece portion comprising a housing containing one or more components (e.g., control components and/or various electronics for controlling the operation of the smoking article), and a power source portion therebetween comprising a component housing or shell containing one or more components (e.g., a rechargeable battery and/or other power source and/or various electronics, such as a controller, for controlling the operation of the smoking article. Additionally or alternatively, the end cap portion and/or the power source portion may be configured to receive a heat/aerosol-generating portion therein comprising a body containing one or more components (e.g., a solid tobacco and/or tobacco-related material for producing an aerosol). Additionally, various smoking article designs and component arrangements can be appreciated upon consideration of the commercially available electronic smoking articles, such as those representative products listed in the background art section of the present disclosure.

Smoking articles of the present disclosure most preferably comprise some combination of a power source (e.g., an electrical power source), at least one control component (e.g., an arrangement for actuating, controlling, regulating and ceasing power for heat generation, such as by controlling electrical current flow from the power source to other components of the article), a heater or heat generation element (e.g., an electrical resistance heating element or component commonly referred to as an “atomizer”), an aerosol-generating element (e.g., a solid tobacco and/or tobacco-related material, an aerosol-generating liquid, etc.), and a mouth-end region, portion, or tip for allowing draw upon the smoking article for aerosol inhalation (e.g., a defined air flow path through the article such that aerosol generated can be withdrawn therefrom upon draw). Alignment of the components within the article is variable. In specific aspects, the aerosol-generating element is disposed between a mouth-end region and a power source. Other configurations, however, are not excluded. For example, in some aspects, the power source is disposed between the mouth-end region and the aerosol-generating element.

Generally, the heater component can be positioned sufficiently near the aerosol-generating element so that heat from the heater component can volatilize the aerosol-generating element (as well as one or more flavorants, medicaments, or the like that may likewise be provided for delivery to a user)

and form an aerosol for delivery to the user. When the heating element heats the aerosol-generating element, an aerosol is formed, released, or generated in a physical form suitable for inhalation by a consumer. It should be noted that the foregoing terms are meant to be interchangeable such that reference to release, releasing, releases, or released includes form or generate, forming or generating, forms or generates, and formed or generated. Specifically, an inhalable substance is released in the form of a vapor or aerosol or mixture thereof. Additionally, the selection of various smoking article components can be appreciated upon consideration of the commercially available electronic smoking articles, such as those representative products listed in the background art section of the present disclosure.

According to aspects of the present disclosure, a smoking article incorporates a battery or other electrical power source to provide electrical current flow sufficient to provide various functionalities to the article, such as resistive heating, powering of control systems, powering of indicators, and the like. The power source can take on various aspects. Preferably, the power source is able to deliver sufficient power to rapidly heat the heating element to provide for aerosol formation and power the article through use for the desired duration of time. The power source preferably is sized to fit conveniently within the article so that the article is easily handled; and additionally, a preferred power source is of a sufficiently light weight to not detract from a desirable smoking experience.

Examples of useful power sources include lithium ion batteries that preferably are rechargeable (e.g., a rechargeable lithium-manganese dioxide battery). In particular, lithium polymer batteries are usable as such batteries provide increased safety. Other types of batteries—e.g., N50-AAA CADNICA nickel-cadmium cells—may also be used. Even further examples of batteries that can be used according to the disclosure are described in U.S. Pub. App. No. 2010/0028766 to Peckerar et al., the disclosure of which is incorporated herein by reference in its entirety. Thin film batteries may be used in certain aspects of the disclosure. Any of these batteries or combinations thereof can be used in the power source, but rechargeable batteries are preferred because of cost and disposal considerations associated with disposable batteries. In aspects wherein disposable batteries are provided, the smoking article can include access for removal and replacement of the battery. Alternatively, in aspects where rechargeable batteries are used, the smoking article can comprise charging contacts, for interaction with corresponding contacts in a conventional recharging unit deriving power from a standard 120-volt AC wall outlet, or other sources such as an automobile electrical system or a separate portable power supply, including USB connections. An arrangement for recharging the battery can be provided in a portable charging case that can include, for example, a relatively larger battery unit that can provide multiple charges for the relatively smaller batteries present in the smoking article. The smoking article further can include components for providing a non-contact inductive recharging system such that the smoking article can be charged without being physically connected to an external power source. Thus, the smoking article can include components to facilitate transfer of energy from an electromagnetic field to the rechargeable battery within the smoking article.

In some aspects, the power source also can comprise one or more capacitors. For example, the power source may include a combination of any number of batteries and/or capacitors. In some aspects, the power source may include at least one battery and at least one capacitor. Capacitors are capable of discharging more quickly than batteries and are chargeable between puffs, allowing the battery to discharge into the capacitor at a lower rate than if it were used to power the heating element directly. For example, a supercapacitor—i.e., an electric double-layer capacitor (EDLC)—may be used separate from or in combination with a battery. When used alone, the supercapacitor may be recharged before each use of the smoking article. Thus, the disclosure also may include a charger component that can be attached to the smoking article between uses to replenish the supercapacitor.

The smoking article can further include a variety of power management software, hardware, and/or other electronic control components. For example, such software, hardware, and/or electronic controls can include such functionality as carrying out charging of the battery, detecting the battery charge and discharge status, performing power save operations, preventing unintentional or over-discharge of the battery, and/or the like.

A “controller”, “control component”, “control device”, and/or “control unit” according to the present disclosure can encompass a variety of elements useful in the present smoking article. Moreover, a smoking article according to the disclosure can include one, two, or even more control units that can be combined into a unitary element or that can be present at separate locations within the smoking article, and individual control units can be utilized for carrying out different control aspects. For example, a smoking article can include a control device that is integral to or otherwise combined with a battery so as to control electrical power discharge from the battery. The smoking article separately can include a control device that controls other functions of the article, such as regulation of the heating component to provide for a particular heating temperature for the aerosol-generating element in conjunction with an aerosol-generating element identification device. Alternatively, a single controller may be provided that carries out multiple control functions or all control functions of the article. Likewise, a sensor (e.g., a puff and/or draw sensor) used in the article can include a control device that controls the actuation of power discharge from the power source in response to a stimulus. The smoking article separately can include a control device that controls other functions of the article. Alternatively, a single controller may be provided in or otherwise associated with the sensor for carrying out multiple control functions or all control functions of the article. Thus, it can be seen that a variety of combinations of controllers may be combined in the present smoking article to provide the desired level of control of all functionality of the article.

The smoking article can also comprise one or more control devices useful for controlling flow of electrical energy from the power source to further components of the article, such as to a heating element. Specifically, the article can comprise a control unit that actuates electrical current flow from the power source to the heating element. According to some aspects of the present disclosure, the smoking article can include a pushbutton that can be linked to a control circuit for manual control of electrical current flow, wherein a consumer can use the pushbutton to turn on the article and/or to actuate electrical current flow to the heating element. Multiple buttons can be provided for manual performance of powering the article on and off, and for activating heating of a heating element such as, for example, a resistive heating element, for aerosol generation. One or more pushbuttons present can be substantially flush with an outer surface of the smoking article.

Instead of (or in addition to) the pushbutton, the smoking article can include one or more control devices responsive to the consumer's drawing on the article (i.e., puff-actuated heating). For example, the article may include a switch that is sensitive either to pressure changes or air flow changes as the consumer draws on the article (i.e., a puff-actuated switch). Other suitable current actuation/deactuation mechanisms may include a temperature actuated on/off switch or a lip pressure actuated switch. An exemplary mechanism that can provide such puff-actuation capability includes a Model 163PC01D36 silicon sensor, manufactured by the MicroSwitch division of Honeywell, Inc., Freeport, Ill. With such a sensor, the heating element can be activated rapidly by a change in pressure when the consumer draws on the article. In addition, flow sensing devices, such as those using hot-wire anemometry principles, may be used to cause the energizing of the heating element sufficiently rapidly after sensing a change in air flow. A further puff actuated switch that may be used is a pressure differential switch, such as Model No. MPL-502-V, range A, from Micro Pneumatic Logic, Inc., Ft. Lauderdale, Fla. Another suitable puff actuated mechanism is a sensitive pressure transducer (e.g., equipped with an amplifier or gain stage) which is in turn coupled with a comparator for detecting a predetermined threshold pressure. Yet another suitable puff actuated mechanism is a vane which is deflected by airflow, the motion of which vane is detected by a movement sensing arrangement. Yet another suitable actuation mechanism is a piezoelectric switch. Also useful is a suitably connected Honeywell MicroSwitch Microbridge Airflow Sensor, Part No. AWM 2100V from MicroSwitch Division of Honeywell, Inc., Freeport, Ill. Further examples of demand-operated electrical switches that may be employed in a heating circuit according to the present disclosure are described in U.S. Pat. No. 4,735,217 to Gerth et al., which is incorporated herein by reference in its entirety. Other suitable differential switches, analog pressure sensors, flow rate sensors, or the like, will be apparent to the skilled artisan with the knowledge of the present disclosure. A pressure-sensing tube or other passage providing fluid connection between the puff-actuated switch and an air flow passage within the smoking article can be included so that pressure changes during draw are readily identified by the switch. Further description of current regulating circuits and other control units, including microcontrollers that can be useful in the present smoking article are provided in U.S. Pat. Nos. 4,922,901, 4,947,874, and 4,947,875, all to Brooks et al., U.S. Pat. No. 5,372,148 to McCafferty et al., U.S. Pat. No. 6,040,560 to Fleischhauer et al., and U.S. Pat. No. 7,040,314 to Nguyen et al., all of which are incorporated herein by reference in their entireties.

Capacitive sensing components in particular can be incorporated into the device in a variety of manners to allow for diverse types of "power-up" and/or "power-down" for one or more components of the device. Capacitive sensing can include the use of any sensor incorporating technology based on capacitive coupling including, but not limited to, sensors that detect and/or measure proximity, position or displacement, humidity, fluid level, pressure, or acceleration. Capacitive sensing can arise from electronic components providing for surface capacitance, projected capacitance, mutual capacitance, or self-capacitance. Capacitive sensors generally can detect anything that is conductive or has a dielectric different than that of air. Capacitive sensors, for example, can replace mechanical buttons (i.e., the pushbutton referenced above) with capacitive alternatives. Thus, one specific application of capacitive sensing according to the disclosure is a touch capacitive sensor. For example, a touchable portion (i.e., a touch pad) can be present on the smoking article that allows the user to input a variety of commands. Most basically, the touch pad can provide for powering the heating element much in the same manner as a push button, as already described above. In other aspects, capacitive sensing can be applied near the mouth end of the smoking article such that the presence and/or pressure of the lips on the smoking article or draw on the article can signal the device to provide power to the heating element. In addition to touch capacitance sensors, motion capacitance sensors, liquid capacitance sensors, and accelerometers can be utilized according to the disclosure to elicit a variety of response from the smoking article. Further, photoelectric sensors also can be incorporated into the inventive smoking article.

Sensors utilized in the present smoking articles can expressly signal for power flow to the heating element so as to heat the aerosol-generating element and form an aerosol for inhalation by a user. Sensors can also provide further functions. For example, a "wake-up" sensor can be included. Other sensing methods providing similar function likewise can be utilized according to the disclosure.

When the consumer draws on the mouth end of the smoking article, an actuation mechanism can permit unrestricted or uninterrupted flow of electrical current through the heating element to generate heat rapidly. Because of the rapid heating, it can be useful to include current regulating components to (i) regulate current flow through the heating element to control heating of the resistive element and the temperature experienced thereby, and (ii) prevent overheating and degradation of the aerosol-generating elements.

The current regulating circuit particularly may be time based. Specifically, such a circuit includes a mechanism for permitting uninterrupted current flow through the heating element for an initial time period during draw, and a timer device for subsequently regulating current flow until draw is completed. For example, the subsequent regulation can include the rapid on-off switching of current flow (e.g., on the order of about every 1 to 50 milliseconds) to maintain the heating element within the desired temperature range. Further, regulation may comprise simply allowing uninterrupted current flow until the desired temperature is achieved, and then turning off the current flow completely. The heating element may be reactivated by the consumer initiating another puff on the article (or manually actuating the pushbutton, depending upon the specific switch aspect employed for activating the heater). Alternatively, the subsequent regulation can involve the modulation of current flow through the heating element to maintain the heating element within a desired temperature range. In some aspects, so as to release the desired amount of the inhalable substance, the heating element may be energized for a duration of about 0.2 second to about 5.0 seconds, about 0.3 second to about 4.5 seconds, about 0.5 second to about 4.0 seconds, about 0.5 second to about 3.5 seconds, or about 0.6 second to about 3.0 seconds. One exemplary time-based current regulating circuit can include a transistor, a timer, a comparator, and a capacitor. Suitable transistors, timers, comparators, and capacitors are commercially available and will be apparent to the skilled artisan. Exemplary timers are those available from NEC Electronics as C-1555C and from General Electric Intersil, Inc. as ICM7555, as well as various other sizes and configurations of so-called "555 Timers". An exemplary comparator is available from National Semiconductor as LM311. Further description of such time-based current regulating circuits and other control units that can be useful in the present smoking article are provided in U.S. Pat. Nos. 4,922,901, 4,947,874, and 4,947,875, all to Brooks et al., all of which are incorporated herein by reference in their entireties.

The control units particularly can be configured to closely control the amount of heat provided to the heating element. In some aspects, a current regulating component can function to stop current flow to the heating element once a defined temperature has been achieved. Such a defined temperature can be in a range that is substantially high enough to volatilize the aerosol-generating element and any further inhalable substances and provide an amount of aerosol equivalent to a typical puff on a conventional cigarette, as otherwise discussed herein. While the heat needed to volatilize the aerosol-generating element in a sufficient volume to provide a desired volume for a single puff is variable, it can be particularly useful for the heating element to heat to a temperature of about 120° C. or greater, about 130° C. or greater, about 140° C. or greater, or about 160° C. In some aspects, in order to volatilize an appropriate amount of the aerosol-generating element, the heating temperature may be about 180° C. or greater, about 200° C. or greater, about 300° C. or greater, or about 350° C. or greater. In additional aspects, the defined temperature for aerosol formation can be about 120° C. to about 350° C., about 140° C. to about 300° C., or about 150° C. to about 250° C. The temperature and time of heating can be controlled by one or more components contained in the smoking article. For example, the temperature may be controlled by one or more components that may be responsive to a user input so as to provide for a particular desired temperature such as, for example, an aerosol-generating element heating temperature, a standby temperature, and/or the like. In some aspects, the temperature may be controlled by one or more components that may be responsive to a user input such that a user may select a desired aerosol-generating heating temperature based at least upon the constituent components of the aerosol-generating element. The current regulating component likewise can cycle the current to the resistive heating element off and on once a defined temperature has been achieved so as to maintain the defined temperature for a defined period of time.

In some aspects, a smoking article according to the present disclosure can include an aerosol-generating element identification device configured to identify, upon actuation thereof, an attribute of the aerosol-generating element (such as an aerosol-generating heating temperature, or a heating profile of each of the constituent components of the aerosol-generating element) and thereby communicate the attribute to the control device for modulation of the electrical energy provided to the heating element in order to heat the aerosol-generating element to the desired aerosol-generating heating temperature.

Still further, the current regulating component can cycle the current to the heating element off and on to maintain a first temperature that is below an aerosol forming temperature and then allow an increased current flow in response to a current actuation control component so as to achieve a second temperature that is greater than the first temperature and that is an aerosol forming temperature. Such controlling can improve the response time of the article for aerosol formation such that aerosol formation begins almost instantaneously upon initiation of a puff by a consumer. According to some aspects, the first temperature (which can be characterized as a standby temperature) can be only slightly less than the aerosol forming temperature defined above. Specifically, the standby temperature can be about 50° C. to about 150° C., about 70° C. to about 140° C., about 80° C. to about 120° C., or about 90° C. to about 110° C.

In addition to the above control elements, the smoking article also may comprise one or more indicators or indicia. Such indicators or indicia may be lights (e.g., light emitting diodes) that can provide indication of multiple aspects of use of the inventive article. Further, LED indicators may be positioned at the distal end of the smoking article to simulate color changes seen when a conventional cigarette is lit and drawn on by a user. Other indices of operation are also encompassed by the present disclosure. For example, visual indicators of operation also may include changes in light color or intensity to show progression of the smoking experience. Tactile indicators of operation and sound indicators of operation similarly are encompassed by the disclosure. Moreover, combinations of such indicators of operation also may be used in a single smoking article. According to another aspect, the smoking article may include one or more indicators or indicia, such as, for example, a display configured to provide information corresponding to the operation of the smoking article such as, for example, the amount of power remaining in the power source, progression of the smoking experience, indication corresponding to activating a heating element, and/or the like.

A smoking article, according to the disclosure, can further comprise a heating element that heats an aerosol-generating element to produce an aerosol for inhalation by a user. In various aspects, the heating element can be formed of a material that provides resistive heating when an electrical current is applied thereto. Preferably, the heating element exhibits an electrical resistance making a resistive heating element useful for providing a sufficient quantity of heat when electrical current flows therethrough. Interaction of the heating element with the aerosol-generating element may be through, for example, heat conduction, heat radiation, and/or heat convection.

Electrically conductive materials useful as resistive heating elements can be those having low mass, low density, and moderate resistivity and that are thermally stable at the temperatures experienced during use. Useful heating elements heat and cool rapidly, and thus provide for the efficient use of energy. Rapid heating of the element can be beneficial to provide almost immediate volatilization of an aerosol-generating element in proximity thereto. Rapid cooling (i.e., to a temperature below the volatilization temperature of the aerosol-generating element/component/composition/material) prevents substantial volatilization (and hence waste) of the aerosol-generating element during periods when aerosol formation is not desired. Such heating elements also permit relatively precise control of the temperature range experienced by the aerosol-generating element, especially when time based current control is employed. Useful electrically conductive materials preferably are chemically non-reactive with the materials being heated (e.g., aerosol-generating elements and/or other inhalable substance materials) so as not to adversely affect the flavor or content of the aerosol or vapor that is produced. Exemplary, non-limiting, materials that can be used as the electrically conductive material include carbon, graphite, carbon/graphite composites, metals, metallic and non-metallic carbides, nitrides, silicides, inter-metallic compounds, cermets, metal alloys, and metal foils. In particular, refractory materials may be useful. Various, different materials can be mixed to achieve the desired properties of resistivity, mass, and thermal conductivity. In specific aspects, metals that can be utilized include, for example, nickel, chromium, alloys of nickel and chromium (e.g., nichrome), and steel. Materials that can be useful for providing resistive heating are described in U.S. Pat. No. 5,060,671 to Counts et al.; U.S. Pat. No. 5,093,894 to Deevi et al.; U.S. Pat. No. 5,224,498 to Deevi et al.; U.S. Pat. No. 5,228,460 to Sprinkel Jr., et al.; U.S. Pat. No. 5,322,075 to Deevi et al.; U.S. Pat. No. 5,353,813 to Deevi et al.; U.S. Pat. No. 5,468,936 to Deevi et al.; U.S. Pat. No. 5,498,850 to Das; U.S. Pat. No. 5,659,656 to Das; U.S. Pat. No. 5,498,855 to Deevi et al.; U.S. Pat. No. 5,530,225 to Hajaligol; U.S. Pat. No. 5,665,262 to Hajaligol; U.S. Pat. No. 5,573,692 to Das et al.; and U.S. Pat. No. 5,591,368 to Fleischhauer et al., the disclosures of which are incorporated herein by reference in their entireties.

The heating element can be provided in a variety forms, such as in the form of a foil, a foam, discs, spirals, fibers, wires, films, yarns, strips, ribbons, or cylinders. In some aspects, a resistive heating element according to the present disclosure can be a conductive substrate, such as that described in U.S. Pat. App. Pub. No. 2013/0255702 to Griffith et al., the disclosure of which is incorporated herein by reference in its entirety.

Beneficially, a resistive heating element can be provided in a form that enables the heating element to be positioned in intimate contact with or in close proximity to the aerosol-generating element (i.e., to provide heat to the aerosol-generating element through, for example, conduction, radiation, or convection). In other aspects, a resistive heating element can be provided in a form such that the aerosol-generating element can be positioned proximate to the resistive heating element for substantially even distribution of heat for aerosolization of the aerosol-generating element.

In certain aspects, a smoking article according to the present disclosure can include an aerosol-generating element that may include tobacco, a tobacco component, or a tobacco-derived material (i.e., a material that is found naturally in tobacco that may be isolated directly from the tobacco or synthetically prepared). In some aspects, the aerosol-generating element may include a blend of flavorful and aromatic tobaccos in cut filler form. In another aspect, the aerosol-generating element may include a reconstituted tobacco material, such as described in U.S. Pat. No. 4,807,809 to Pryor et al.; U.S. Pat. No. 4,889,143 to Pryor et al. and U.S. Pat. No. 5,025,814 to Raker, the disclosures of which are incorporated herein by reference in their entirety. Additionally, a reconstituted tobacco material may include a reconstituted tobacco paper described for the type of cigarettes described in Chemical and Biological Studies on New Cigarette Prototypes that Heat Instead of Burn Tobacco, R. J. Reynolds Tobacco Company Monograph (1988), the contents of which are incorporated herein by reference in its entirety. For example, a reconstituted tobacco material may include a sheet-like material containing tobacco and/or tobacco-related materials. In some aspects, the aerosol-generating element may be formed from a wound roll of a reconstituted tobacco material. In another aspect, the aerosol-generating element may be formed from shreds, strips, and/or the like of a reconstituted tobacco material.

According to another aspect, a smoking article according to the present disclosure can include an aerosol-generating element that may include a porous, inert material such as, for example, a ceramic material. In another aspect, the aerosol-generating element may include a porous, inert material that does not substantially react, chemically and/or physically, to a tobacco-related material such as, for example, a tobacco-derived extract.

Tobacco that may be employed can include, or can be derived from, tobaccos such as flue-cured tobacco, burley tobacco, Oriental tobacco, Maryland tobacco, dark tobacco, dark-fired tobacco and Rustica tobacco, as well as other rare or specialty tobaccos, or blends thereof. Various representative tobacco types, processed types of tobaccos, and types of tobacco blends are set forth in U.S. Pat. No. 4,836,224 to Lawson et al.; U.S. Pat. No. 4,924,888 to Perfetti et al.; U.S. Pat. No. 5,056,537 to Brown et al.; U.S. Pat. No. 5,159,942 to Brinkley et al.; U.S. Pat. No. 5,220,930 to Gentry; U.S. Pat. No. 5,360,023 to Blakley et al.; U.S. Pat. No. 6,701,936 to Shafer et al.; U.S. Pat. No. 6,730,832 to Dominguez et al.; U.S. Pat. No. 7,011,096 to Li et al.; U.S. Pat. No. 7,017,585 to Li et al.; U.S. Pat. No. 7,025,066 to Lawson et al.; U.S. Pat. App. Pub. No. 2004/0255965 to Perfetti et al.; PCT Pub. No. WO 02/37990 to Bereman; and Bombick et al., *Fund. Appl. Toxicol.,* 39, p. 11-17 (1997); the disclosures of which are incorporated herein by reference in their entireties.

According to another aspect of the present disclosure, an aerosol-generating element may include tobacco, a tobacco component, and/or a tobacco-derived material that may be treated, manufactured, produced, and/or processed to incorporate an aerosol-forming material (e.g., humectants such as, for example, propylene glycol, glycerin, and/or the like) and/or at least one flavoring agent, as well as a burn retardant (e.g., diammonium phosphate and/or another salt) configured to help prevent ignition, pyrolysis, combustion, and/or scorching of the aerosol-generating element by the heating element. Various manners and methods for incorporating tobacco into smoking articles, and particularly smoking articles that are designed so as to not purposefully burn virtually all of the tobacco within those smoking articles are set forth in U.S. Pat. No. 4,947,874 to Brooks et al.; U.S. Pat. No. 7,647,932 to Cantrell et al.; U.S. Pat. No. 8,079,371 to Robinson et al.; U.S. Pat. No. 7,290,549 to Banerjee et al.; and U.S. Pat. App. Pub. No. 2007/0215167 to Crooks et al.; the disclosures of which are incorporated herein by reference in their entireties.

According to one aspect of the present disclosure, flame/burn retardant materials and additives that may be included within the aerosol-generating element may include organo-phosphorus compounds, borax, hydrated alumina, graphite, potassium tripolyphosphate, dipentaerythritol, pentaerythritol, and polyols. Others such as nitrogenous phosphonic acid salts, mono-ammonium phosphate, ammonium polyphosphate, ammonium bromide, ammonium borate, ethanolammonium borate, ammonium sulphamate, halogenated organic compounds, thiourea, and antimony oxides may be used but are not preferred agents. In each aspect of flame-retardant, burn-retardant, and/or scorch-retardant materials used in the aerosol-generating element and/or other components (whether alone or in combination with each other and/or other materials), the desirable properties most preferably are provided without undesirable off-gassing or melting-type behavior.

According to another aspect of the present disclosure, the aerosol-generating element can also incorporate tobacco additives of the type that are traditionally used for the manufacture of tobacco products. Those additives can include the types of materials used to enhance the flavor and aroma of tobaccos used for the production of cigars, cigarettes, pipes, and the like. For example, those additives can include various cigarette casing and/or top dressing components. See, for example, U.S. Pat. No. 3,419,015 to Wochnowski; U.S. Pat. No. 4,054,145 to Berndt et al.; U.S. Pat. No. 4,887,619 to Burcham, Jr. et al.; U.S. Pat. No. 5,022,416 to Watson; U.S. Pat. No. 5,103,842 to Strang et al.; and U.S. Pat. No. 5,711,320 to Martin; the disclosures of which are incorporated herein by reference in their entireties. Preferred casing materials include water, sugars and syrups (e.g., sucrose, glucose and high fructose corn syrup), humectants (e.g. glycerin or propylene glycol), and flavoring agents (e.g., cocoa and licorice). Those added components also include top dressing materials (e.g., flavoring materials, such as menthol). See, for example, U.S. Pat. No. 4,449,541 to Mays et al., the disclosure of which is incorporated herein by reference in its entirety. Further materials that can be added include those disclosed in U.S. Pat. No. 4,830,028 to Lawson et al. and U.S. Pat. No. 8,186,360 to Marshall et al., the disclosures of which are incorporated herein by reference in their entireties.

For example, in some aspects, the aerosol-generating element can comprise one or more different components, such as an aerosol-forming material including, for example, polyhydric alcohol (e.g., glycerin, propylene glycol, or a mixture thereof). Representative types of further aerosol-forming materials are set forth in U.S. Pat. No. 4,793,365 to Sensabaugh, Jr. et al.; U.S. Pat. No. 5,101,839 to Jakob et al.; PCT WO 98/57556 to Biggs et al.; and Chemical and Biological Studies on New Cigarette Prototypes that Heat Instead of Burn Tobacco, R. J. Reynolds Tobacco Company Monograph (1988); the disclosures of which are incorporated herein by reference. In some aspects, an aerosol-generating element can produce a visible aerosol upon the application of sufficient heat thereto (and cooling with air, if necessary), and the aerosol-generating element can produce an aerosol that can be considered to be "smoke-like." In other aspects, the aerosol-generating element can produce an aerosol that can be substantially non-visible but can be recognized as present by other characteristics, such as flavor or texture. Thus, the nature of the produced aerosol can vary depending upon the specific components of the aerosol-generating element. The aerosol-generating element can be chemically simple relative to the chemical nature of the smoke produced by burning tobacco.

A wide variety of types of flavoring agents, or materials that alter the sensory or organoleptic character or nature of the mainstream aerosol of the smoking article can be employed. Such flavoring agents can be provided from sources other than tobacco and can be natural or artificial in nature. Of particular interest are flavoring agents that are applied to, or incorporated within, the aerosol-generating element and/or those regions of the smoking article where an aerosol is generated. Again, such agents can be supplied directly to a heating cavity proximate to the resistive heating element or may be provided with the aerosol-generating element. Exemplary flavoring agents include vanillin, ethyl vanillin, cream, tea, coffee, fruit (e.g., apple, cherry, strawberry, peach and citrus flavors, including lime and lemon), maple, menthol, mint, peppermint, spearmint, wintergreen, nutmeg, clove, lavender, cardamom, ginger, honey, anise, sage, cinnamon, sandalwood, jasmine, cascarilla, cocoa, licorice, and flavorings and flavor packages of the type and character traditionally used for the flavoring of cigarette, cigar, and pipe tobaccos. Syrups, such as high fructose corn syrup, also can be employed. Flavoring agents also can include acidic or basic characteristics (e.g., organic acids, such as levulinic acid, succinic acid, and pyruvic acid). The flavoring agents can be combined with the aerosol-generating material if desired. Exemplary plant-derived compositions that may be used are disclosed in U.S. App. Pub. Nos. 2012/0152265 and 2012/0192880 both to Dube et al., the disclosures of which are incorporated herein by reference in their entireties. The selection of such further components are variable based upon factors such as the sensory characteristics that are desired for the present article, and the present disclosure is intended to encompass any such further components that may be readily apparent to those skilled in the art of tobacco and tobacco-related or tobacco-derived products. See, Gutcho, Tobacco Flavoring Substances and Methods, Noyes Data Corp. (1972) and Leffingwell et al., Tobacco Flavoring for Smoking Products (1972), the disclosures of which are incorporated herein by reference in their entireties.

Any of the materials, such as flavorings, casings, and the like that can be useful in combination with a tobacco material to affect sensory properties thereof, including organoleptic properties, such as already described herein, may be combined with the aerosol-generating element. Organic acids particularly may be incorporated into the aerosol-generating element to affect the flavor, sensation, or organoleptic properties of medicaments, such as nicotine, that may be combined with the aerosol-generating element. For example, organic acids, such as levulinic acid, lactic acid, and pyruvic acid, may be included in the aerosol-generating element with nicotine in amounts up to being equimolar (based on total organic acid content) with the nicotine. Any combination of organic acids can be used. For example, the aerosol-generating element can include about 0.1 to about 0.5 moles of levulinic acid per one mole of nicotine, about 0.1 to about 0.5 moles of pyruvic acid per one mole of nicotine, about 0.1 to about 0.5 moles of lactic acid per one mole of nicotine, or combinations thereof, up to a concentration wherein the total amount of organic acid present is equimolar to the total amount of nicotine present in the aerosol-generating element. Various additional examples of organic acids employed to produce an aerosol-generating element are described in U.S. Pat. App. Pub. No. 2015/0344456 to Dull et al., which is incorporated herein in its entirety by reference.

In still another aspect of the present disclosure, the aerosol-generating element may be configured as an extruded structure and/or substrate that may include, or may essentially be comprised of tobacco, tobacco-related material, glycerin, water, and/or a binder material, although certain formulations may exclude the binder material. The binder material may be any binder material commonly used for tobacco formulations including, for example, carboxymethyl cellulose (CMC), gum (e.g. guar gum), xanthan, pullulan, and/or an alginate. According to some aspects, the binder material included in the aerosol-generating element may be configured to substantially maintain a structural shape and/or integrity of the aerosol-generating element. Various representative binders, binder properties, usages of binders, and amounts of binders are set forth in U.S. Pat. No. 4,924,887 to Raker et al., which is incorporated herein by reference in its entirety.

In another aspect, the aerosol-generating element may include a plurality of microcapsules, beads, granules, and/or the like having a tobacco-related material. For example, a representative microcapsule may be generally spherical in shape, and may have an outer cover or shell that contains a liquid center region of a tobacco-derived extract and/or the like. In some aspects, the aerosol-generating element may include a plurality of microcapsules substantially formed into a hollow cylindrical shape. In one aspect, the aerosol-generating element may include a binder material configured to substantially maintain the structural shape and/or integrity of the plurality of microcapsules substantially formed into the hollow cylindrical shape.

In some aspects, the aerosol-generating element may be configured as an extruded material, as described in U.S. Pat. App. Pub. No. 2012/0042885 to Stone et al., which is incorporated herein by reference in its entirety. In yet another aspect, the aerosol-generating element may include an extruded structure and/or substrate formed from marumarized and/or non-marumarized tobacco. Marumarized tobacco is known, for example, from U.S. Pat. No. 5,105,831 to Banerjee, et al., which is incorporated by reference herein in its entirety. Marumarized tobacco may include about 20 to about 50 percent (by weight) tobacco blend in powder form, with glycerol (at about 20 to about 30 percent weight), calcium carbonate (generally at about 10 to about 60 percent by weight, often at about 40 to about 60 percent by weight), along with binder agents, as described herein, and/or flavoring agents.

The aerosol-generating element may take on a variety of conformations based upon the various amounts of materials utilized therein. For example, a useful aerosol-generating element may comprise up to about 98% by weight up to about 95% by weight, or up to about 90% by weight of a tobacco and/or tobacco material. A useful aerosol-generating element also can comprise up to about 25% by weight, about 20% by weight or about 15% by weight water—particularly about 2% to about 25%, about 5% to about 20%, or about 7% to about 15% by weight water. Flavors and the like (which can include medicaments, such as nicotine) can comprise up to about 10%, up to about 8%, or up to about 5% by weight of the aerosol-generating element.

Additionally or alternatively, the aerosol-generating element may be configured as an extruded structure and/or a substrate that may include or may essentially be comprised of tobacco, glycerin, water, and/or binder material, and may be further configured to substantially maintain its structure throughout the aerosol-generating process. That is, the aerosol-generating element may be configured to substantially maintain its shape (i.e., the aerosol-generating element does not continually deform under an applied shear stress) throughout the aerosol-generating process. Although the aerosol-generating element may include liquids and/or may have some moisture content, the aerosol-generating element remains substantially solid throughout the aerosol-generating process and substantially maintains structural integrity throughout the aerosol-generating process. Exemplary tobacco and/or tobacco related materials suitable for a substantially solid aerosol-generating element are described in U.S. Pat. App. Pub. No. 2015/0157052 to Ademe et al.; U.S. Pat. App. Pub. No. 2015/0335070 to Sears et al.; U.S. Pat. No. 6,204,287 to White; and U.S. Pat. No. 5,060,676 to Hearn et al., which are all incorporated herein in their entirety by reference respectively.

Additionally or alternatively, the aerosol-generating element may be configured as a liquid capable of yielding an aerosol upon application of sufficient heat, having ingredients commonly referred to as "smoke juice," "e-liquid" and "e-juice". Exemplary formulations for an aerosol-generating liquid that may be used according to the present disclosure are described in U.S. Pat. Pub. No. 2013/0008457 to Zheng et al., the disclosure of which is incorporated herein by reference in its entirety.

The amount of aerosol-generating element that is used within the smoking article is such that the article exhibits acceptable sensory and organoleptic properties, and desirable performance characteristics. For example, it is highly preferred that sufficient aerosol-forming material such as, for example, glycerin and/or propylene glycol, be employed within the aerosol-generating element in order to provide for the generation of a visible mainstream aerosol that in many regards resembles the appearance of tobacco smoke. Typically, the amount of aerosol-forming material incorporated into the aerosol-generating element of the smoking article is in the range of about 1.5 g or less, about 1 g or less, or about 0.5 g or less.

The amount of aerosol-generating element can be dependent upon factors such as the number of puffs desired per cartridge used with the smoking article. It is desirable for the aerosol-generating element not to introduce significant degrees of unacceptable off-taste, filmy mouth-feel, or an overall sensory experience that is significantly different from that of a traditional type of cigarette that generates mainstream smoke by burning tobacco cut filler. The selection of the particular aerosol-forming material, the amounts of those components used, and the types of tobacco material used, can be altered in order to control the overall chemical composition of the aerosol produced by the aerosol-generating element of the smoking article.

In further aspects, heating can be characterized in relation to the amount of aerosol to be generated. Specifically, the smoking article can be configured to provide an amount of heat necessary to generate a defined volume of aerosol (e.g., about 0.5 ml to about 100 ml, or any other volume deemed useful in a smoking article, such as otherwise described herein). In certain instances, the amount of heat generated can be measured in relation to a two second puff providing about 35 ml of aerosol at a heater temperature of about 290° C. In some aspects, the article preferably can provide about 1 to about 50 Joules of heat per second (J/s), about 2 J/s to about 40 J/s, about 3 J/s to about 35 J/s, or about 5 J/s to about 30 J/s.

The heating element preferably is in electrical connection with the power source of the smoking article such that electrical energy can be provided to the heating element to produce heat and subsequently aerosolize the aerosol-generating element and any other inhalable substance provided by the smoking article. Such electrical connection can be permanent (e.g., hard wired) or can be removable (e.g., wherein a resistive heating element is provided in a body or portion that can be attached to and detached from a power source).

Although a variety of materials for use in a smoking article according to the present disclosure have been described above—such as heaters, batteries, capacitors, switching components, aerosol-generating elements, aerosol-forming materials, and/or the like, the disclosure should not be construed as being limited to only the exemplified aspects. Rather, one of skill in the art can recognize based on the present disclosure similar components in the field that may be interchanged with any specific component of the present disclosure. For example, U.S. Pat. No. 5,261,424 to Sprinkel, Jr. discloses piezoelectric sensors that can be associated with the mouth-end of a device to detect user lip activity associated with taking a draw and then trigger heating; U.S. Pat. No. 5,372,148 to McCafferty et al. discloses a puff sensor for controlling energy flow into a heating load array in response to pressure drop through a mouthpiece; U.S. Pat. No. 5,967,148 to Harris et al. discloses receptacles in a smoking device that include an identifier that detects a non-uniformity in infrared transmissivity of an inserted component and a controller that executes a detection routine as the component is inserted into the receptacle; U.S. Pat. No. 6,040,560 to Fleischhauer et al. describes a defined executable power cycle with multiple differential phases; U.S. Pat. No. 5,934,289 to Watkins et al. discloses photonic-optronic components; U.S. Pat. No. 5,954,979 to Counts et al. discloses means for altering draw resistance through a smoking device; U.S. Pat. No. 6,803,545 to Blake et al. discloses specific battery configurations for use in smoking devices; U.S. Pat. No. 7,293,565 to Griffen et al. discloses various charging systems for use with smoking devices; U.S. Pat. No. 8,402,976 to Fernando et al. discloses computer interfacing means for smoking devices to facilitate charging and allow computer control of the device; and U.S. Pat. App. Pub. No. 2010/0163063 to Fernando et al. discloses identification systems for smoking devices; all of the foregoing disclosures being incorporated herein by reference in their entireties. Further examples of components related to electronic aerosol delivery articles and disclosing materials or components that may be used in the present article include U.S. Pat. No. 4,735,217 to Gerth et al.; U.S. Pat. No. 5,249,586 to Morgan et al.; U.S. Pat. No. 5,666,977 to Higgins et al.; U.S. Pat. No. 6,053,176 to Adams et al.; U.S. Pat. No. 6,204,287 to White; U.S. Pat. No. 6,196,218 to Voges; U.S. Pat. No. 6,810,883 to Felter et al.; U.S. Pat. No. 6,854,461 to Nichols; U.S. Pat. No. 7,832,410 to Hon; U.S. Pat. No. 7,513,253 to Kobayashi; U.S. Pat. No. 7,896,006 to Hamano; U.S. Pat. No. 6,772,756 to Shayan; U.S. Pat. Nos. 8,156,944, 8,375,957 to Hon; U.S. Pat. Pub. Nos. 2006/0196518 and 2009/0188490 to Hon; U.S. Pat. No. 8,794,231 to Thorens et al.; U.S. Pat. Nos. 8,915,254 and 8,925,555 to Monsees et al.; U.S. Pat. No. 8,851,083 and U.S. Pat. Pub. No. 2010/0024834 to Oglesby et al.; U.S. Pat. Pub. No. 2010/0307518 to Wang; and WO 2010/091593 to Hon. A variety of the materials disclosed by the foregoing documents may be incorporated into the present devices in various aspects, and all of the foregoing disclosures are incorporated herein by reference in their entireties.

Although a smoking article according to the disclosure may take on a variety of aspects, as discussed in detail below, the use of the smoking article by a consumer will be similar in scope. The foregoing description of use of the smoking article can be applied to the various aspects described through minor modifications, which can be apparent to the person of skill in the art in light of the further disclosure provided herein. The above description of use, however, is not intended to limit the use of the inventive article but is provided to comply with all necessary requirements of disclosure herein.

Referring now to FIGS. 1A and 1B, an exemplary smoking article 100 is illustrated. In some aspects, the smoking article 100 generally comprises a mouthpiece portion 110, a housing 120 defining a cavity 122 associated with a heating element 130, and a component housing 140 that includes a power source 150, an aerosol-generating element identification device 160, and a control device 170. In some aspects, the component housing 140 and the housing 120 are separately formed such that the heating element 130, the power source 150, the aerosol-generating element identification device 160, and/or the control device 170 are discretely disposed in just the housing 120 or in just the component housing 140, such that the housing 120 and the component housing 140 are readily separable. In other aspects, one or more of the heating element 130, the power source 150, the aerosol-generating element identification device 160, and/or the control device 170 are included in an integrally formed housing unit.

The mouthpiece portion 110 of the smoking article 100, in some examples, defines a mouth-engaging end (i.e., the end upon which a consumer draws to inhale aerosol from the smoking article) and a housing-engaging end that is longitudinally opposed to the mouth-engaging end. In some aspects, the mouthpiece portion 110 is engaged with the housing 120 such that the housing-engaging end is either permanently (i.e., is integrally formed) or removably engaged with the housing 120. An interior of the mouthpiece portion 110 defines at least one orifice therethough to provide a mouthpiece channel 112 through the mouthpiece portion 110 and into the housing 120, when engaged therewith. A filtration material (not shown) is, in some aspects, capable of being received within the mouthpiece portion 110.

The housing 120 defines, in some aspects, a first, mouthpiece-engaging end and a second, longitudinally-opposed component-engaging end, which may be configured to operably engage a tubular housing-engaging end of the component housing 140. An inlet defined either in the component housing 140 or in the housing 120 enables air to be drawn into the smoking article 100. For example, and as illustrated in FIGS. 1A and 1B, an inlet or orifice 142 is defined in the component housing 140. In this instance, upon engagement with the component housing 140, an air flow passageway 124 is defined between the cavity 122 of the housing 120 and an interior of the component housing 140. The air flow passageway 124 is arranged and configured to fluidly connect and communicate with an interior of the component housing 140 so as to provide for air to be drawn into the cavity 122 via at least one orifice 142 defined within the component housing 140. Further, the mouthpiece channel 112 is also in fluid communication, via the cavity 122, with the air flow passageway 124. Accordingly, in response to a draw upon the mouth-engaging end of the mouthpiece portion 110, air, in turn, is drawn through the at least one orifice 142, through the interior of the component housing 140, through the air flow passageway 124, into the cavity 122 of the housing 120.

In another example, an inlet or orifice (not illustrated) is defined in the housing 120. This inlet or orifice is in fluid communication with an interior of the housing 120 or the cavity 122 such that in response to a draw upon the mouth-engaging end of the mouthpiece portion 110, air, in turn, is drawn through the orifice defined the housing 120 and into the cavity 122 of the housing 120.

Regardless of the disposition of the inlet or orifice within the smoking article, the air drawn into the smoking article is configured to be drawn into the cavity 122 so as to interact with the aerosol-generating element 180 and/or the heating element 130. Within the cavity 122 of the housing 120, the air is mixed with the aerosol generated by the aerosol-generating element 180 and the aerosol/air mixture is transported through the mouthpiece channel 112 to the mouth-engaging end of the mouthpiece portion 110.

The aerosol-generating element 180 is configured to produce an aerosol in response to heat. As is known to those of skill in the art, the aerosol-generating element 180 may be comprised of two or more constituent components wherein each has a different aerosolization temperature. As such, identification of the constituent components of the aerosol-generating element 180 may allow optimization of the heating of the aerosol-generating element 180 based on those constituent components. As previously mentioned, the constituent components of the aerosol-generating element 180 include, in some aspects, tobacco, a tobacco component, or a tobacco-derived material (i.e., a material that is found naturally in tobacco that may be isolated directly from the tobacco or synthetically prepared). The tobacco that is employed includes, or is derivable from, tobaccos such as flue-cured tobacco, burley tobacco, Oriental tobacco, Maryland tobacco, dark tobacco, dark-fired tobacco and *Rustica* tobacco, as well as other rare or specialty tobaccos, or blends thereof. In another aspect, the constituent components of the aerosol-generating element 180 include tobacco and/or tobacco-related material and an additional flavoring agent and/or other material that alters the sensory or organoleptic character or nature of the mainstream aerosol of the smoking article 100. Such flavoring agents are providable from sources other than tobacco and are natural or artificial in nature. In some aspects, flavoring agents are applied to, or incorporated within, the aerosol-generating element 180 and/or those regions of the smoking article 100 where an aerosol is generated (i.e., the cavity 122).

Although, in some aspects, flavoring agents are directly applied to the aerosol-generating element 180 and/or the cavity 122, in other aspects, a flavoring agent is providable by a separate substrate that is disposed proximate to the aerosol-generating element 180 and/or proximate to the cavity 122. Exemplary flavoring agents include vanillin, ethyl vanillin, cream, tea, coffee, fruit (e.g., apple, cherry, strawberry, peach and citrus flavors, including lime and lemon), maple, menthol, mint, peppermint, spearmint, wintergreen, nutmeg, clove, lavender, cardamom, ginger, honey, anise, sage, cinnamon, sandalwood, jasmine, cascarilla, cocoa, licorice, and flavorings and flavor packages of the type and character traditionally used for the flavoring of cigarette, cigar, and pipe tobaccos. Syrups, such as high fructose corn syrup, also are employable. Flavoring agents also include in some aspects acidic or basic characteristics (e.g., organic acids, such as levulinic acid, succinic acid, and pyruvic acid).

Notably, depending on the type of smoking article (e.g., an electronic cigarette, a 'heat not-burn (HNB), etc.), the aerosol-generating element 180 is variable in its format, constituent components, composition, delivery method, receptacle, etc. In some examples, the aerosol-generating element 180 comprises an annular tobacco plug configured to be removably received within the cavity 122 of the housing 120. In this instance, the annular tobacco plug is formed as a solid tobacco and/or tobacco-related material, and is constructed as a hollow cylinder extrudate, as illustrated in FIG. 3A, to be described in more detail below. In another example, the aerosol-generating element 180 comprises, an aerosol-generating liquid received in a cartridge, the cartridge being removably engaged or otherwise refillable and permanently engaged with the housing 120. In this instance, the aerosol-generating liquid is formed as an e-liquid, as illustrated in FIG. 3B, to be described in more detail below.

The housing 120 defining the cavity 122 of the smoking article 100 is configured, in some aspects, to receive the aerosol-generating element 180 therein. As illustrated in FIGS. 1A, 1B, the housing 120 has in some aspects a substantially round cross-section; however, other cross-sectional shapes (e.g., oval, square, triangle, etc.) also are encompassed by the present disclosure. Regardless, the cavity 122 defined by the housing 120 is generally dependent on the cross-section of the housing 120, such that a tubular housing results in a substantially cylindrical cavity 122 having a substantially round cross-section. Therefore, aerosol-generating element 180 (e.g., an annular tobacco plug, an aerosol-generating liquid received in a cylindrical cartridge, etc.) is, for example, configured with a diameter or otherwise a cross-sectional area that enables the aerosol-generating element 180 to be received within the cavity 122 and subsequently heated to produce an aerosol.

In some aspects, the heating element 130 is operably engaged with the housing 120 and is configured to provide heat to the aerosol-generating element 180. As illustrated in FIG. 1B, for example, the heating element 130 is disposed within the cavity 122; however, in other examples, the heating element 130 is provided in the component housing 140 or otherwise in the housing 120 (i.e., surrounding a wall defining the cavity 122). In some instances, the heating element 130 comprises a resistive heating element (e.g., a resistive coil), though other types of heating elements (i.e., induction, microwave, radiative, etc.) are also contemplated, as necessary or desired.

The power source 150 is configured to be, in some aspects, in electrical communication with the heating element 130 and to provide electrical energy thereto. In this manner, the heating element 130 is configured to produce heat in response to the electrical energy. As illustrated in FIG. 1B, the power source 150 is included in the component housing 140 along with the control device 170, which are arranged in a variety of orders therein. The power source 150 comprises, in some aspects, a rechargeable or replaceable battery or any other type of power storage unit. Otherwise, in some aspects, the power source 150 comprises an inductive coil or any other type of power producer.

Although not expressly shown, it is understood that the smoking article 100, and the component housing 140 in particular, include wiring or other conductor arrangements, as necessary, to provide electrical current from the power source 150 to the additional components and to interconnect the components for appropriate operation of the necessary functions provided by the smoking article 100. For example, the smoking article 100 includes wiring (not shown) within the component housing 140 and/or the housing 120 as necessary to provide electrical current from the power source 150 of the component housing 140 to the heating element 130 located within the housing 120. According to another aspect of the present disclosure, for example, the smoking article 100 includes wiring or other conductor arrangements (not shown) within the component housing 140 and/or housing 120 as necessary to provide electrical current from the power source 150, to the aerosol-generating element identification device 160, as well as to any of one or more status indicators and/or other indicia positioned on or disposed within any one or a combination of the mouthpiece portion 110, housing 120, and/or component housing 140.

In some aspects, the aerosol-generating element identification device 160 is engaged with the housing 120 and is configured to identify, upon actuation thereof, an attribute of the aerosol-generating element 180 selected for use with the smoking article 100. Engagement of the aerosol-generating element identification device 160 comprises, for example, engagement with the housing 120, the component housing 140, or the mouthpiece portion 110. For example, and as illustrated in FIGS. 1A, 1B, the aerosol-generating element identification device 160 is flush or substantially flush with the housing 120. Otherwise, the aerosol-generating element identification device 160 protrudes from the housing 120, the component housing 140, or the mouthpiece portion 110 in a manner not unduly burdensome to the consumer.

An exemplary aerosol-generating element identification device 200 is illustrated in FIG. 2. In some instances, the aerosol-generating element identification device 200 is similar to the aerosol-generating element identification device 160 described above in reference to the aerosol-generating element identification device in FIGS. 1A, 1B. In some aspects, the aerosol-generating element identification device 200 is configured with at least one hardware processor (e.g., processor unit) 202 connected to memory (e.g., storage device) 204. Generally, the processor 202 is any piece of computer hardware that is capable of processing information such as, for example, data, computer programs, and/or other suitable electronic information. The processor 202 is comprised of a collection of electronic circuits, some of which may be packaged as an integrated circuit or multiple interconnected integrated circuits (an integrated circuit at times more commonly referred to as a "chip"). The processor 202 may be configured to execute computer programs, which may be stored onboard the processor or otherwise stored in the memory (of the same or another apparatus).

The processor 202 may be a number of processors, a multi-processor core or some other type of processor, depending on the particular implementation. Further, the processor 202 may be implemented using a number of heterogeneous processor systems in which a main processor is present with one or more secondary processors on a single chip. As another illustrative example, the processor 202 is a symmetric multi-processor system containing multiple processors of the same type. In yet another example, the processor 202 is embodied as or otherwise includes one or more application-specific integrated circuits (ASICs), field-programmable gate arrays (FPGAs) or the like. Thus, although the processor 202 is capable of executing a computer program to perform one or more functions, the processor of various examples is capable of performing one or more functions without the aid of a computer program.

The memory 204 is generally any piece of computer hardware that is capable of storing information such as, for example, data, computer programs (e.g., computer-readable program code) and/or other suitable information either on a temporary basis and/or a permanent basis. The memory 204 may include volatile and/or non-volatile memory, and may be fixed or removable. Examples of suitable memory 204 include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory 204 is referred to as a computer-readable storage medium. The computer-readable storage medium 204 is a non-transitory device capable of storing information, and is distinguishable from computer-readable transmission media such as electronic transitory signals capable of carrying information from one location to another. A computer-readable medium as described herein may generally refer to a computer-readable storage medium or computer-readable transmission medium.

As indicated above, program code instructions (e.g., an algorithm) may be stored in the memory 204, and executed by the processor 202, to implement functions of the smoking article described herein. As will be appreciated, any suitable program code instructions may be loaded onto a computer or other programmable apparatus from a computer-readable storage medium to produce a particular machine, such that the particular machine implements the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture implements functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by the processor 202, or storage of instructions in the computer-readable storage medium 204, supports combinations of operations for performing the specified functions. In this manner, the aerosol-generating element identification device 160 described in conjunction with the smoking article 100 includes the processor 202 and the computer-readable storage medium or memory 204 coupled to the processor 202, where the processor 202 is configured to execute an algorithm stored in the memory 204. It will also be understood that one or more functions, and combinations of functions, may be implemented by special purpose hardware-based computer systems and/or processors which perform the specified functions, or combinations of special purpose hardware and program code instructions.

Referring back to FIGS. 1A, 1B, in some exemplary implementations, the aerosol-generating element identification device 160 comprises an attribute identification detector configured to detect an attribute identifier identifying an attribute of the aerosol-generating element 180. In some examples, the attribute of the aerosol-generating element 180 is encoded (i.e., stored) within the attribute identifier. The attribute identifier comprises, for example, a Universal Product Code (UPC) barcode, a QR-Code, or a radio-frequency identification (RFID) device identifying the attribute of the aerosol-generating element 180. An attribute of the aerosol-generating element 180 stored within the attribute identifier is, in some aspects, selected from the group consisting of constituent components (e.g., flavors, tobacco-derived nicotine, water, glycerol, propylene glycol) of the aerosol-generating element, a heating profile of each constituent component of the aerosol-generating element, a maximum aerosolization temperature between the constituent components of the aerosol-generating element, a wattage for controlling the power source relative to the maximum aerosolization temperature between the constituent components of the aerosol-generating element, and combinations thereof. For example, the attribute of the aerosol-generating element 180 stored within an attribute identifier comprises the constituent components of the aerosol-generating element 180, which include a tobacco-derived nicotine, a flavor, and assorted other ingredients, e.g., 4.8% nicotine, glycerol, water, propylene glycol, and natural and artificial flavorings. In this manner, the attribute identifier identifying the attribute is provided on a packaging of the aerosol-generating element 180 for detection by the attribute identification detector.

More particularly, for example, and as illustrated in FIGS. 3A-3C, an attribute identifier (i.e., an exemplary QR-code) is provided on exemplary packaging. In particular, in FIG. 3A, a schematic generally indicated as reference numeral 300A illustrates packaging 302A. The packaging 302A is any type of packaging sufficient to contain an aerosol-generating material, such as a solid aerosol-generating material 180A, e.g., an annular tobacco plug. An attribute identifier 304A is, as illustrated in FIG. 3A, for example, provided on the packaging 302A of the solid aerosol-generating material 180A.

FIG. 3B illustrates a schematic generally indicated as reference numeral 300B. In FIG. 3B, a packaging 302B is provided, which, in some aspects, is any type of packaging of a tubular housing or cartridge 306 for containing an aerosol-generating material, such as an aerosol-generating liquid 180B, e.g., an e-liquid. An attribute identifier 304B is, as illustrated in FIG. 3B, for example, provided on the packaging 302B of the cartridge 306 of the aerosol-generating liquid 180B. In FIG. 3C, a schematic generally indicated as reference numeral 300C is provided. In FIG. 3C, the cartridge 306 of FIG. 3B is illustrated. In comparison with FIG. 3B, in FIG. 3C, an attribute identifier 304C corresponding to the attribute identifier 304B provided on the packaging of the cartridge 306 is also provided on the cartridge 306, itself. In other aspects, (not shown), the cartridge 306 illustrated in FIGS. 3B, 3C is configured to be refillable to receive the aerosol-generating liquid 180B therein. The cartridge 306 is configured to receive the aerosol-generating liquid 180B from a refill container that comprises its own attribute identifier. In this manner, the cartridge 306 is able to be refillable to receive different aerosol-generating liquids 180B from different refill containers, where the refill containers provide identifiable information regarding the aerosol-generating liquid 180B contained therein.

Referring back to FIGS. 1A, 1B, the aerosol-generating element identification device 160 in the form of the attribute identification detector comprises, for example, a camera, a wireless transceiver, or a scanner configured to detect, upon actuation thereof, the attribute identifier (e.g., 304A-304C, FIGS. 3A-3C), in order to identify the attribute of the aerosol-generating element 180 associated therewith, and to communicate the identification of the attribute to the control device 170. The attribute identification detector is actuatable, in some aspects, upon recognition of the attribute identifier (e.g., automatic optical recognition of the QR-Code). Otherwise, an actuation mechanism linked to the attribute identification detector and/or the smoking article 100, itself, renders the aerosol-generating element identification device 160 able to detect the attribute identifier. Thus, in some aspects, the control device 170 is configured to be in communication with the aerosol-generating element identification device 160 to modulate the electrical energy provided to the heating element 130 by the power source 150, in response to the identified attribute, so as to direct the heating element 130 to heat the aerosol-generating element 180 to an aerosolization temperature associated with the identified attribute of the aerosol-generating element 180.

In some aspects, the component housing 140 includes additional wiring or other conductor arrangements as necessary to provide electrical current from the power source 150 to the control device 170 and provide electrical connections between the control device 170 and the heating element 130 and/or the aerosol-generating element identification device 160 so as to enable the control device 170 to modulate the electrical energy provided to the heating element 130 by the power source 150. In specific aspects, the smoking article 100 includes an electrical circuit wherein the control device 170 associated with the electrical circuit delivers, controls, or otherwise modulates the electrical energy provided to the heating element 130 by the power source 150, in response to the identified attribute, so as to direct the heating element 130 to heat the aerosol-generating element 180 to an aerosolization temperature associated with the identified attribute of the aerosol-generating element 180.

More particularly, the electrical circuit associated with the control device 170 includes appropriate wiring or other appropriate electrical conductors electrically connecting the control device 170 and the aerosol-generating element identification device 160. As such, identification by the aerosol-generating element identification device 160 of an attribute of the aerosol-generating element causes the identified attribute to be transmitted to the control device 170 so that the control device 170 can modulate the electrical energy provided to the heating element 130.

In some exemplary implementations, the aerosol-generating element identification device 160 does not comprise an attribute identification detector configured to detect an attribute identifier on a package of the aerosol-generating element 180. Rather, and referring back to the exemplary aerosol-generating element identification device 160, the processor 202 of the aerosol-generating element identification device 160, 200 is configured in some examples to execute an algorithm stored in the memory 204 that causes the aerosol-generating element identification device 160 to identify, upon actuation thereof, an attribute of the aerosol-generating element 180. For example, execution of the algorithm results in elemental analysis of the aerosol-generating element 180 as directed by the aerosol-generating element identification device 160. In such an instance, elemental analysis includes spectroscopy, chemical analysis, spectrometry, x-ray, or a combination thereof, to identify the attribute of the aerosol-generating element 180. Devices associated with such elemental analysis (e.g., probes, x-ray tubes, etc.,) are, in some aspects, in communication with the processor 202 of the aerosol-generating element identification device 160 to perform the elemental analysis. The attribute identifiable by the elemental analysis includes, for example, constituent components (e.g., a flavor, nicotine) of the aerosol-generating element 180, a heating profile of each constituent component of the aerosol-generating element 180, a maximum aerosolization temperature between the constituent components of the aerosol-generating element 180, a wattage for controlling the power source relative to the maximum aerosolization temperature between the constituent components of the aerosol-generating element 180, and combinations thereof.

In some aspects, the processor 202 of the aerosol-generating element identification device 160 is configured to execute an algorithm stored in the memory 204 upon actuation of an actuation mechanism (not shown) associated with the smoking article 100 and/or the aerosol-generating element identification device 160, itself. Otherwise, receipt of the aerosol-generating element 180 in the cavity 122, as indicated by a sensor, for example, actuates the processor 202 to begin execution of the algorithm stored in the memory 204. Other manners of actuating the processor 202 to begin executing the algorithm are also contemplated herein. Regardless, the attribute identified from the executed algorithm is configured to be stored, in some aspects, by the memory 204 for further analysis and/or comparison.

In other examples, the processor 202 is configured to execute an algorithm stored in the memory 204 that causes the aerosol-generating element identification device 160 to determine a maximum aerosolization temperature between constituent components identified by the aerosol-generating element 180. Using the identified attribute of the constituent components thereof, the aerosol-generating element identification device 160 is able to compare aerosolization temperatures between the constituent components of the aerosol-generating element 180 and determine the maximum aerosolization temperature between the constituent components.

In still further examples, the processor 202 is configured to execute an algorithm stored in the memory 204 that causes the aerosol-generating element identification device 160 to communicate the determined maximum aerosolization temperature to the control device 170. As such, in this instance, the control device 170 is configured to modulate the electrical energy provided to the heating element 130 by the power source 150 in response to the determined maximum aerosolization temperature. It is desirable to enable modulated heat output to the aerosol-generating element 180 based on a maximum aerosolization temperature as this minimizes the likelihood of overheating of the aerosol-generating element 180, which enhances user experience of any constituent flavors. Additionally, modulating the electrical energy provided to the heating element 130 by the power source 150 results in optimizing the amount of power used and extends the overall life of the power source 150.

In further exemplary implementations, the aerosol-generating element identification device 160 is configured to receive user input regarding a maximum aerosolization temperature between constituent components of the aerosol-generating element 180. In this manner, the control device 170 is configured to modulate the electrical energy provided to the heating element 130 by the power source 150 in response to the user input maximum aerosolization temperature.

In such an implementation, rather than using an algorithm or an attribute identification detector to detect an attribute identifier on a package of the aerosol-generating element 180, the aerosol-generating element identification device 160 is configured with a user interface 206 that enables a user to input the attribute(s) of the aerosol-generating element 180 to the aerosol-generating element identification device 160.

More particularly, and referring back to FIG. 2 the processor 202 in some example is connected to one or more interfaces 206 for displaying, transmitting, and/or receiving information. The interfaces 206 include, in some aspects, a communications interface (e.g., communications unit) and/or one or more user interfaces. The communications interface is configured to transmit and/or receive information, such as to and/or from other circuits within the smoking article (i.e., the control unit 170). The communications interface is in electrical communication with the control unit 170 via appropriate circuitry and/or other connections to transmit the determined maximum aerosolization temperature to the control device 170, as well as any other information (e.g., wattage) to the control device 170.

The user interface includes, in some aspects, a display 208 and/or one or more user input interfaces (e.g., input/output unit). The display 208 of the aerosol-generating element identification device 160 is configured to present or otherwise display information to a user, suitable examples of which include a liquid crystal display (LCD), light-emitting diode display (LED), plasma display panel (PDP) or the like. In some aspects, the display 208 and the user input interfaces are the same (e.g., a touchscreen) so that the user is able to actuate the aerosol-generating element identification device 160 by inputting the maximum aerosolization temperature between constituent components of the aerosol-generating element 180 at the display 208.

Accordingly, the smoking article 100 is configured to provide a smoking or smoke-like sensation to a consumer. More particularly, the smoking article 100 is configured to be actuated by an actuation mechanism (not shown) to provide the consumer with a satisfactory sensory experience through identifying an attribute of the aerosol-generating element (e.g., the maximum aerosolization temperature between constituent components of the aerosol-generating element 180) and subsequently modulating the electrical energy provided to the heating element 130 by the power source 150, in response to the identified attribute, so as to direct the heating element 130 to heat the aerosol-generating element 180 to an aerosolization temperature associated with the identified attribute of the aerosol-generating element 180 to reduce the likelihood of burning the constituent components of the aerosol-generating element 180 and thereby promote such a satisfactory experience for the user. In some aspects, the actuation mechanism is a pushbutton, a puff sensor, a flow sensor, or any other consumer-activated mechanism. For example, where the actuation mechanism is a pushbutton, the pushbutton is linked to a control circuit for manual control of electrical current flow, wherein the consumer uses the pushbutton to turn on the smoking article 100 and/or to actuate electrical current flow to the heating element 130. In this instance, one or more buttons are provided for manual performance of powering the smoking article 100 on and off, which then sends a signal to actuate the control device 170 to direct power from the power source 150 to the heating element 130.

The control device 170, in communication with the aerosol-generating element identification device 160 is configured to modulate the electrical energy or power directed from the power source 150 to the heating element 130 based on and in response to the identified attribute of the aerosol-generating element 180. As such, the heating element 130 produces heat to be provided to the aerosol-generating element 180 within the cavity 122 that is modulated based on the attribute of the aerosol-generating element 180. The aerosol-generating element 180, in turn, then produces and provides an aerosol, in response to the heat, wherein the aerosol is suitable for inhalation by the consumer. In another example, the actuation mechanism is a flow sensor (not shown) such that the smoking article 100 is only actuated upon application of a draw (i.e., at times of use by the consumer exerting a draw on the mouthpiece portion 110). In such an instance, the flow sensor is configured to detect a puff by the consumer or draw on the article, which then sends a signal to actuate the control device 170.

Referring now to FIGS. 4A-4B, a smoking article 400 is illustrated. The smoking article 400 comprises components similar to the components of the smoking article 100 illustrated in FIGS. 1A, 1B. For conciseness, substantially similar components will not be described again in detail.

In some aspects, the smoking article 400 generally comprises a mouthpiece portion 410, a tubular housing 420 defining a cavity 422 associated with a heating element 430, and a component housing 440 that includes a power source 450, an aerosol-generating element identification device 460, and a control device 470. A solid aerosol-generating material 480 is configured to be received within the cavity 422 of the tubular housing 420.

In some exemplary aspects, the mouthpiece portion 410 is engaged with the housing 420 such that the housing-engaging end is either permanently (i.e., is integrally formed) or removably engaged with the housing 420. Where the mouthpiece portion 410 is removably engaged with the housing 420, and as illustrated in FIG. 4B, each of a housing-engaging end of the mouthpiece portion 410 and a mouthpiece engaging end of the housing 420 is provided with a plurality of threads, such that the mouthpiece portion 410 is able to be threadingly received at the mouthpiece engaged end of the housing 420. In this manner, when the mouthpiece portion 410 is removed from the housing 420, an interior of the cavity 422 defined by the housing 420 is accessible to receive the solid aerosol-generating material 480 therein. Other engagement mechanisms for engaging the mouthpiece portion 410 with the housing 420 are also contemplated herein.

In some aspects, when the mouthpiece piece portion 410 is engaged with the housing 420, an interior of the mouthpiece portion 410 defines at least one orifice therethough to provide a mouthpiece channel 412 through the mouthpiece portion 410 and into the housing 420. A filtration material 414 is, in some aspects, capable of being received within the mouthpiece channel 412. In some aspects, the filtration material 414 is cellulose acetate or otherwise includes an absorbent or adsorbent material capable of reducing predetermined levels of particulates generated from the heating of the solid aerosol-generating material 480.

In some aspects, the tubular housing 420 is configured to operably engage a tubular housing-engaging end of the component housing 440. An inlet defined either in the component housing 440 or in the housing 420 enables air to be drawn into the smoking article 400. For example, and as illustrated in FIG. 4B, an inlet or orifice 442 is defined in the component housing 440. As shown in FIGS. 4A, 4B, the component-engaging end of the housing 420 is longitudinally opposed to the mouthpiece-engaging end of the housing 420. Upon engagement with the component housing 440, in some instances, an air flow passageway 424 is defined between the cavity 422 of the housing 420 and an interior of the component housing 440. In some instances, the air flow passageway 424 is arranged and configured to fluidly connect and communicate with an interior of the component housing 440 so as to provide for air to be drawn into the cavity 422 via at least one orifice 442 defined within the component housing 440. Further, the mouthpiece channel 412 is also in fluid communication, via the cavity 422, with the air flow passageway 424. Accordingly, in response to a draw upon the mouth-engaging end of the mouthpiece portion 410, air, in turn, is drawn through the at least one orifice 442, through the interior of the component housing 440, through the air flow passageway 424, into the cavity 422 of the housing 420.

In another example, an inlet or orifice (not illustrated) is defined in the housing 420. This inlet or orifice is in fluid communication with an interior of the housing 420 or the cavity 422 such that in response to a draw upon the mouth-engaging end of the mouthpiece portion 410, air, in turn, is drawn through the orifice defined the housing 420 and into the cavity 422 of the housing 420.

Regardless of the disposition of the inlet or orifice within the smoking article, the air drawn into the smoking article is configured to be drawn into the cavity 422 to interact with the aerosol-generating element 480 and/or the heating element 430. Within the cavity 422 of the housing 420, the air is mixed with the aerosol produced by the heated aerosol-generating element 480 and the aerosol/air mixture is transported through the mouthpiece channel 412 to the mouth-engaging end of the mouthpiece portion 410.

In some aspects, the solid aerosol-generating material 480 is configured to be removed from within the cavity 422 of the tubular housing 420. For example, after the solid aerosol-generating material 480 is "used-up" such that no more aerosol is capable of being generated therefrom, it is advantageous to remove the solid aerosol-generating material 480 and replace it with another solid aerosol-generating material 480. In order to do so, in some exemplary implementations, the tubular housing 420 comprises a removal mechanism 444 configured to remove the solid aerosol-generating material 480 (e.g., an annular tobacco plug) from within the cavity 422 of the tubular housing 420. The removal mechanism 444 comprises for example, a biasing mechanism or any other type of mechanism that applies pressure to the solid-aerosol-generating material 480 along a longitudinal axis thereof to push the solid aerosol-generating material 480 towards an opening of the cavity 422 for removal of the solid aerosol-generating material 480 upon disengagement of the mouthpiece portion 410 from the tubular housing 420.

The heating element 430 is, in some aspects, operably engaged with the tubular housing 420 and is configured to provide heat to the solid aerosol generating material 480 in order to aerosolize said material. Where the tubular housing 420 comprises an outer wall 426 defining the cavity 422, the heating element 430 comprises a first portion 432 configured to extend about the outer wall 426 and a second portion 434 configured to extend within the cavity 422 defined by the outer wall 426. More particularly, in some aspects, the first portion 432 is configured with a larger diameter than a diameter of the second portion 434. An insulating sleeve 428 in some exemplary implementations is provided around an external circumference of the outer wall 426 to provide enhanced insulating properties to the smoking article 400.

As such, in these instances, the solid aerosol-generating material 480 comprises an annular tobacco plug (e.g., 180A, FIG. 3A) configured to be removably received within the cavity 422 of the tubular housing 420, such that an inner surface of the annular tobacco plug extends about the second portion 434 of the heating element 430 and the first portion 432 of the heating element 430 extends about an outer surface of the annular tobacco plug within the cylindrical cavity 422. In this manner, the solid aerosol-generating material 480 is configured to be removably and replaceably received by the cavity 422 of the tubular housing 420 upon disengagement of the mouthpiece portion 410 and the tubular housing 420.

The heating element 430 is, in some aspects, in electrical communication with the power source 450. The power source 450 in some exemplary implementations is configured to provide electrical energy to the heating element 430, such that the heating element 430 produces heat in response to the electrical energy. The power source 450 comprises, in some aspects, a rechargeable or replaceable battery.

In some aspects, the power source 450 comprises wiring providing power to the aerosol-generating element identification device 460, which is engaged or engageable with the mouthpiece portion 410, the tubular housing 420, or the component housing 440. As illustrated in FIG. 4A, the aerosol-generating element identification device 460 is engaged with the component housing 440, although the aerosol-generating element identification device 460 is configured to be provided on any of the mouthpiece portion 410, the tubular housing 420, or the component housing 440.

Similar to the aerosol-generating element identification device 160 described above, the aerosol-generating element identification device 460 is configured to identify, upon actuation thereof, an attribute of the solid aerosol-generating material 480. The attribute of the solid aerosol-generating material 480, in some aspects, is selected from the group consisting of a flavor, a heating profile of each constituent component of the solid aerosol-generating material 480, a maximum aerosolization temperature between the constituent components of the solid aerosol-generating material 480, a wattage for controlling the power source 430 relative to the maximum aerosolization temperature of the constituent components of the solid aerosol-generating material 480, and combinations thereof.

In some exemplary implementations, the aerosol-generating element identification device 460 comprises an attribute identification detector configured to detect an attribute identifier identifying the attribute of the solid aerosol-generating material 480 (e.g., FIG. 3A). In such aspects, the attribute identifier comprises a UPC barcode, a QR-Code, or an RFID device identifying the attribute of the solid aerosol-generating material 480. To detect the attribute identifier, the attribute identification detector comprises, for example, a camera, a wireless transceiver, or a scanner configured to detect, upon actuation thereof, the attribute identifier, to identify the attribute of the solid aerosol-generating material 480 associated therewith, and to communicate the identification of the attribute to the control device 470. For example, the attribute identification detector 460 is configured to detect the attribute identifier on a package containing a new annular tobacco plug (e.g., FIG. 3A).

In other exemplary implementations, the aerosol-generating element identification device 460 comprises a processor (e.g., 202) configured to execute an algorithm to identify, upon actuation thereof, the attribute of the solid aerosol-generating material 480. For example, the processor of the aerosol-generating element identification device 460 is configured to execute an algorithm stored in a memory (e.g., (204) to cause the aerosol-generating element identification device 460 to analyze the solid aerosol-generating material 480 to determine constituent components thereof, to determine a maximum aerosolization temperature between the constituent components, and to communicate the determined maximum aerosolization temperature to the control device 470.

In this manner, the control device 470 is in communication with the aerosol-generating element identification device 460 and is configured to modulate the electrical energy provided to the heating element 430 by the power source 450, in response to the identified attribute, so as to direct the heating element 430 to heat the solid aerosol-generating material 480 to the determined maximum aerosolization temperature in response to receiving the determined maximum aerosolization temperature from the aerosol-generating element identification device 460.

In another exemplary implementation, the aerosol-generating element identification device 460 is configured to receive user input regarding a maximum aerosolization temperature between constituent components of the solid aerosol-generating material 480. For example, and as described above, a user interface (e.g., 206) and/or a display (e.g., 208) are configured to receive user input regarding attribute(s) of the aerosol-generating element 480, e.g., aerosolization temperatures for constituent components of the solid aerosol-generating material 480. The aerosol-generating element identification device 460 is configured, in some aspects, to analyze the user inputs and identify which is the aerosolization temperature input. In this manner, the aerosolization temperature is then transmitted to the control device 470, such that the control device 470 is configured to modulate the electrical energy provided to the heating element 430 by the power source 450 in response to the user input maximum aerosolization temperature.

In some aspects, where the heating element 430 comprises the first portion 432 and the second portion 434, the control device 470 is configured to modulate the electrical energy provided to each portion 432, 434 independently. More particularly, the control device 470 is configured to modulate the electrical energy provided to the first portion 432 separately and discretely from the electrical energy provided to the second portion 434 of the heating element 430 so as to provide for individual control of the first and second portions 432, 434. As such, first portion 432 is capable of being heated to a higher temperature, a lower temperature, or substantially a same temperature relative to the second portion 434. More information regarding independent control of separate heating portions of a heating element can be found in U.S. Patent App. Pub. No. 2016/0360785 to Bless et al.

Referring now to FIG. 5, a smoking article 500 is illustrated. The smoking article 500 comprises components similar to the components of the smoking article 100 illustrated in FIGS. 1A, 1B. For conciseness, substantially similar components will not be described again in detail.

In some aspects, the smoking article 500 generally comprises a mouthpiece portion 510, a tubular housing 520 defining a cavity 522 associated with a heating element 530, and a component housing 540 that includes a power source 550, an aerosol-generating element identification device 560, and a control device 570. An aerosol-generating liquid 580 is configured to be received within the cavity 522 of the tubular housing 520.

In some exemplary aspects, the mouthpiece portion 510 is engaged with the housing 520 such that the housing-engaging end is either permanently (i.e., is integrally formed) or removably engaged with the housing 520. As illustrated in FIG. 5, the mouthpiece portion 510 is integrally formed and engaged with the housing 520 such that the two are irremovably engaged with one another. An interior of the mouthpiece portion 510 defines at least one orifice therethough to provide a mouthpiece channel 512 through the mouthpiece portion 510 and into the housing 520. In some aspects, the mouthpiece channel 512 is defined through a tubular passage 514. A filtration material (not shown) is capable of being received within the mouthpiece channel 512 and/or in the mouthpiece portion 510.

In some aspects, the tubular housing 520 is configured as having a first end and a longitudinally-opposed second end. In some aspects, at the first end is the mouthpiece portion 510 and at the longitudinally-opposed second end is an engagement mechanism to operably engage a longitudinal end of the component housing 540. Alternatively, in other aspects, at the longitudinally-opposed second end is the mouthpiece portion 510 and at the first end is the engagement mechanism to operably engage the longitudinal end of the component housing 540.

Upon engagement between the housing 520 and the component housing 540, in some instances, an air flow passageway 524 is defined between the cavity 522 of the housing 520 and an interior of the component housing 540. In some instances, the air flow passageway 524 is arranged and configured to fluidly connect and communicate with a central passage 544 defined at an engagement interface between the component housing 540 and the tubular housing 520 so as to provide for air to be drawn into the cavity 522 via at least one orifice 542 defined within the component housing 540. Further, the mouthpiece channel 512 is also in fluid communication, via the cavity 522, with the air flow passageway 524. Accordingly, in response to a draw upon the mouth-engaging end of the mouthpiece portion 510, air, in turn, is drawn through the at least one orifice 542, through the interior of the component housing 540, through the air flow passageway 524, into the cavity 522 of the housing 520. Within the cavity 522 of the housing 520, the air is mixed with an aerosol generated from the aerosol-generating liquid 580, and the aerosol/air mixture is transported through the mouthpiece channel 512 to the mouth-engaging end of the mouthpiece portion 510.

The heating element 530 engaged with the tubular housing 530 is configured to provide heat to the aerosol-generating liquid 580. In some aspects, the heating element 530 is configured as a resistive heating element, such as a resistive coil. In such aspects, the resistive heating element 530 comprises terminals 532 (e.g., positive and negative terminals) at the opposing ends thereof for facilitating current flow through the heating element 530 and for attachment of the appropriate wiring (not illustrated) to form an electrical connection of the heating element 530 with the power source 550 when the tubular housing 520 is operably engaged with the component housing 540.

Engagement or disengagement of the component housing 540 and the tubular housing 520 is achievable via an engagement mechanism 546 disposed at the longitudinal end of the component housing and a corresponding engagement mechanism 528 disposed at either the first or at the second end of the tubular housing. The engagement mechanisms 546, 528 provide operable engagement between the component housing 540 and the tubular housing 520 such that the two are capable of being readily removed from one another, such as, for example, to remove and replace the tubular housing 520. Further information regarding engagement mechanisms may be found in, for example, U.S. Pat. No. 8,910,639 to Chang et al.

In some aspects, the cavity 522 of the tubular housing 520 is non-refillable. In this manner, after the consumer consumes the aerosol-generating liquid 580, the tubular housing 520 is removable from the component housing 540 and is disposable, and another tubular housing 520 containing a quantity of aerosol-generating liquid 580 is able to be reattached to the longitudinal end of the component housing 540. As such, the tubular housing 520 with the mouthpiece portion 510 is configured as a replaceable cartridge (e.g., 306, FIGS. 3B, 3C). In other aspects, the cavity 522 of the tubular housing 520 is refillable. In this manner, after the consumer consumes the aerosol-generating liquid 580, the tubular housing 520 is able to either remain operably engaged with the component housing 540 or is removed from the component housing 540 for refilling. As such, the tubular housing 520 with the mouthpiece portion 510 contained therein is configured as a refillable cartridge.

The heating element 530 is, in some aspects, operably engaged with the tubular housing 520 and is configured to provide heat to the aerosol-generating liquid 580 in order to aerosolize said liquid. To do so, the heating element 530 is, in some aspects, in electrical communication with the power source 550. The power source 550 in some exemplary implementations is configured to provide electrical energy to the heating element 530, such that the heating element 530 produces heat in response to the electrical energy. The power source 550 comprises, in some aspects, a rechargeable or replaceable battery. In some aspects, the power source 550 comprises wiring providing power to the aerosol-generating element identification device 560, which is engaged or engageable with the mouthpiece portion 510, the tubular housing 520, or the component housing 540. As illustrated in FIG. 5, the aerosol-generating element identification device 560 is engaged with the component housing 540, although the aerosol-generating element identification device 560 is configured to be provided on any of the mouthpiece portion 510, the tubular housing 520, or the component housing 540.

Similar to the aerosol-generating element identification device 160 described above, the aerosol-generating element identification device 560 is configured to identify, upon actuation thereof, an attribute of the aerosol-generating liquid 580. The attribute of the aerosol-generating liquid 580, in some aspects, is selected from the group consisting of a flavor, a heating profile of each constituent component of the aerosol-generating liquid 580, a maximum aerosolization temperature between the constituent components of the aerosol-generating liquid 580, a wattage for controlling the power source 530 relative to the maximum aerosolization temperature of the constituent components of the aerosol-generating liquid 580, and combinations thereof.

In some exemplary implementations, the aerosol-generating element identification device 560 comprises an attribute identification detector configured to detect an attribute identifier identifying the attribute of the aerosol-generating liquid 580 (e.g., FIGS. 3B, 3C). In such aspects, the attribute identifier comprises a UPC barcode, a QR-Code, or an RFID device identifying the attribute of the aerosol-generating liquid 580. To detect the attribute identifier, the attribute identification detector comprises, for example, a camera, a wireless transceiver, or a scanner configured to detect, upon actuation thereof, the attribute identifier, to identify the attribute of the aerosol-generating liquid 580 associated therewith, and to communicate the identification of the attribute to the control device 570. For example, where the smoking article 500 necessitates a non-refillable cartridge, the attribute identification detector is configured to detect the attribute identifier provided on a packaging of a new tubular housing or cartridge containing the aerosol-generating liquid 580 (e.g., FIG. 3B), or the attribute identifier otherwise is provided on the new tubular housing or cartridge itself containing the aerosol-generating liquid 580 (e.g., FIG. 3C). In another example, where the smoking article 500 necessitates refilling a refillable tubular cartridge, the attribute identification detector is configured to detect the attribute identifier on a package containing the refill aerosol-generating liquid 580.

In other exemplary implementations, the aerosol-generating element identification device 560 comprises a processor (e.g., 202) configured to execute an algorithm to identify, upon actuation thereof, the attribute of the aerosol-generating liquid 580. For example, the processor of the aerosol-generating element identification device 560 is configured to execute an algorithm stored in a memory (e.g., 204) to cause the aerosol-generating element identification device 560 to analyze the aerosol-generating liquid 580 to determine constituent components thereof, to determine a maximum aerosolization temperature between the constituent components, and to communicate the determined maximum aerosolization temperature to the control device 570.

In this manner, the control device 570 is in communication with the aerosol-generating element identification device 560 and is configured to modulate the electrical energy provided to the heating element 530 (e.g., the resistive coil) by the power source 550, in response to the identified attribute, so as to direct the heating element 530 to heat the aerosol-generating liquid 580 the determined maximum aerosolization temperature in response to receiving the determined maximum aerosolization temperature from the aerosol-generating element identification device 560.

In another exemplary implementation, the aerosol-generating element identification device 560 is configured to receive user input regarding a maximum aerosolization temperature between constituent components of the aerosol-generating liquid 580. For example, and as described above, a user interface (e.g., 206) and/or a display (e.g., 208) is configured to receive user input regarding attribute(s) of the aerosol-generating liquid 580, e.g., aerosolization temperatures for constituent components of the aerosol-generating liquid 580. The aerosol-generating element identification device 560 is configured, in some aspects, to analyze the user inputs and identify which is the aerosolization temperature input. In this manner, the aerosolization temperature is then transmitted to the control device 570, such that the control device 570 is configured to modulate the electrical energy provided to the heating element 530 by the power source 550 in response to the user input maximum aerosolization temperature.

Referring now to FIG. 6, a method flow diagram for a method for making a smoking article, generally designated 600, is provided. The smoking article made in the method 600 may be the smoking article 100, 400, 500 or one substantially similar.

In step 602, a heating element is operably engaged with a housing defining a cavity configured to receive an aerosol-generating element therein, the heating element being configured to provide heat to the aerosol-generating element for the aerosol-generating element to produce an aerosol in response thereto.

In step 604, a power source is engaged in electrical communication with the heating element, with the power source being configured to provide electrical energy to the heating element, and the heating element producing heat in response to the electrical energy.

In step 606, an aerosol-generating element identification device is engaged with the housing, with the aerosol-generating element identification device being configured to identify, upon actuation thereof, an attribute of the aerosol-generating element.

In step 608, a control device is engaged with the aerosol-generating element identification device, with the control device being configured to modulate the electrical energy provided to the heating element by the power source, in response to the identified attribute, so as to direct the heating element to heat the aerosol-generating element to an aerosolization temperature associated with the identified attribute of the aerosol-generating element.

Many modifications and other embodiments of the disclosure will come to mind to one skilled in the art to which this disclosure pertains having the benefit of the teachings presented in the foregoing descriptions and the associated drawings. Therefore, it is to be understood that the disclosure is not to be limited to the specific embodiments disclosed herein and that modifications and other embodiments are intended to be included within the scope of the appended claims. Although specific terms are employed herein, they are used in a generic and descriptive sense only and not for purposes of limitation.

That which is claimed:

1. A smoking article comprising:

a housing defining a cavity configured to receive an aerosol-generating element therein, the aerosol generating element including at least one constituent component configured to produce aerosol in response to heat; and an aerosol-generating element identification device engaged with the housing or a power source and configured to interact with an attribute identifier engaged with the aerosol-generating element to identify, upon actuation of the aerosol-generating element identification device, an attribute of the aerosol-generating element, the attribute being associated with the at least one constituent component of the aerosol-generating element, as indicated by the attribute identifier.

2. The article of claim 1, further comprising:

a heating element operably engaged with the housing and configured to provide heat to the aerosol-generating element, wherein the power source is in electrical communication with the heating element and is configured to provide electrical energy thereto, the heating element producing heat in response to the electrical energy; and a control device in communication with the aerosol-generating element identification device and configured to modulate the electrical energy provided to the heating element by the power source so as to direct the heating element to heat the aerosol-generating element to an aerosolization temperature associated with the identified attribute of the aerosol-generating element, the aerosolization temperature being at least the maximum aerosolization temperature of the at least one constituent component of the aerosol-generating element, wherein the aerosol-generating element identification device is configured to identify the attribute through analysis of the at least one constituent component of the aerosol-generating element, or through user input to the aerosol-generating element identification device regarding the maximum aerosolization temperature of the at least one constituent component of the aerosol-generating element.

3. The article of claim 2, wherein the housing comprises an outer wall defining the cavity such that the cavity is a cylindrical cavity.

4. The article of claim 3, wherein the heating element comprises a first portion configured to extend about the outer wall and a second portion configured to extend within the cylindrical cavity.

5. The article of claim 4, wherein the control device is configured to modulate the electrical energy provided to the first portion separately and discretely from the electrical energy provided to the second portion of the heating element so as to provide for individual control of the first and second portions.

6. The article of claim 2, wherein the aerosol-generating element identification device comprises an attribute identification detector configured to detect the attribute identifier identifying the attribute of the aerosol-generating element.

7. The article of claim 6, wherein the attribute identifier comprises a Universal Product Code (UPC) barcode, a QR-Code, or a radio-frequency identification (RFID) device identifying the attribute of the aerosol-generating element.

8. The article of claim 6, wherein the attribute identification detector comprises a camera, a wireless transceiver, or a scanner configured to detect, upon actuation thereof, the attribute identifier, and to identify the attribute of the aerosol-generating element associated therewith, and to communicate the identification of the attribute to the control device.

9. The article of claim 1, wherein a second attribute identifier is provided on a packaging of the aerosol-generating element.

10. The article of claim 2, wherein the attribute of the aerosol-generating element further includes a flavor, a heating profile of the at least one constituent component of the aerosol-generating element, a wattage for controlling the power source relative to the maximum aerosolization temperature of the at least one constituent component of the aerosol-generating element, or combinations thereof.

11. The article of claim 2, wherein the aerosol-generating element identification device comprises a processor configured to execute an algorithm to identify the attribute of the aerosol-generating element associated therewith, and to communicate the identification of the attribute to the control device.

12. The article of claim 11, wherein the aerosol-generating element identification device is configured to analyze the aerosol-generating element to determine the at least one constituent component thereof, determine the maximum aerosolization temperature of the at least one constituent component, and to communicate the determined maximum aerosolization temperature to the control device, and wherein the control device is configured to modulate the electrical energy provided to the heating element by the power source in response to the determined maximum aerosolization temperature.

13. The article of claim 11, wherein the aerosol-generating element identification device is configured to receive user input regarding the maximum aerosolization temperature of the at least one constituent component of the aerosol-generating element and to communicate the user input maximum aerosolization temperature to the control device, and wherein the control device is configured to modulate the electrical energy provided to the heating element by the power source in response to the user input maximum aerosolization temperature.

14. The article of claim 4, wherein the aerosol-generating element comprises an annular tobacco plug configured to be removably received within the cavity of the housing.

15. The article of claim 1, wherein the aerosol-generating element comprises an aerosol-generating liquid received in a cartridge, the cartridge being removably engaged with the housing.

16. The article of claim 14, wherein an inner surface of the annular tobacco plug extends about the second portion of the heating element and such that the first portion of the heating element extends about an outer surface of the annular tobacco plug within the cylindrical cavity.

17. The article of claim 14, wherein the housing comprises a removal mechanism configured to remove the annular tobacco plug from within the cavity of the housing.

18. The article of claim 14, wherein the heating element comprises a resistive coil.

19. The article of claim 14, wherein the housing is removable from a component housing that includes the power source.

* * * * *